US012700757B2

(12) United States Patent
Yu et al.

(10) Patent No.: US 12,700,757 B2
(45) Date of Patent: Aug. 4, 2026

(54) INDUCTIVE POWER TRANSFER TRANSMITTER AND SYSTEM

(71) Applicant: Intdevice Limited, Greenlane (NZ)

(72) Inventors: Li Jun Yu, Mellons Bay (NZ); Hao Hao, Half Moon Bay (NZ)

(73) Assignee: INTDEVICE LIMITED, Greenlane (NZ)

( * ) Notice: Subject to any disclaimer, the term of this patent is extended or adjusted under 35 U.S.C. 154(b) by 153 days.

(21) Appl. No.: 18/556,521

(22) PCT Filed: Apr. 14, 2022

(86) PCT No.: PCT/IB2022/053503
§ 371 (c)(1),
(2) Date: Oct. 20, 2023

(87) PCT Pub. No.: WO2022/224092
PCT Pub. Date: Oct. 27, 2022

(65) Prior Publication Data
US 2024/0186833 A1     Jun. 6, 2024

(30) Foreign Application Priority Data

Apr. 23, 2021     (NZ) ........................................ 775066

(51) Int. Cl.
*H02J 50/12*          (2016.01)
*H02J 50/70*          (2016.01)
(52) U.S. Cl.
CPC .............. *H02J 50/12* (2016.02); *H02J 50/70* (2016.02)
(58) Field of Classification Search
CPC .. H02J 50/12; H02J 50/70; H02J 50/10; H02J 5/00; H02J 7/02; H03H 7/0115;
(Continued)

(56) References Cited

U.S. PATENT DOCUMENTS 9,789,777 B2 * 10/2017 Mi ............................ H02J 7/92
10,144,301 B2 * 12/2018 Nguyen ................ B60L 53/122
(Continued)

FOREIGN PATENT DOCUMENTS

CN        112202251 A      1/2021
JP      2011050140 A      3/2011
(Continued)

OTHER PUBLICATIONS

Aldhaher, S., et al.; "Electronic Tuning of Misaligned Coils in Wireless Power Transfer Systems"; IEEE Transactions on Power Electronics, vol. 29, Issue: Nov. 11, 2014; pp. 5975-5982.
(Continued)

*Primary Examiner* — Menatoallah Youssef
*Assistant Examiner* — Michael J Warmflash
(74) *Attorney, Agent, or Firm* — Tarolli, Sundheim, Covell & Tummino LLP

(57)          ABSTRACT

An inductive power transfer transmitter comprising: an inverter sub-circuit comprising at least one inverter, and a tuned circuit comprising a plurality of components including at least: a transmitting coil; a first tuning network comprising: an inductor, and a capacitor; a second tuning network comprising a first additional component wherein the plurality of components are arranged such that the tuned circuit can: vary current through the transmitting coil to compensate for variations in K coefficient, provide an output current from the inverter sub-circuit independent of a transmitting coil current.

23 Claims, 15 Drawing Sheets

(58) Field of Classification Search
CPC ......... H03H 7/38; H03H 7/09; H02M 1/4266; H02M 7/04; H02M 7/48; H02M 3/22
See application file for complete search history.

(56) References Cited

U.S. PATENT DOCUMENTS

| | | | | |
|---|---|---|---|---|
| 2014/0070764 | A1* | 3/2014 | Keeling | H01F 38/14 |
| | | | | 320/108 |
| 2015/0015197 | A1* | 1/2015 | Mi | H02J 7/92 |
| | | | | 320/108 |
| 2018/0269723 | A1* | 9/2018 | Chen | H02J 50/12 |
| 2018/0269726 | A1* | 9/2018 | Abdolkhani | H02J 50/12 |
| 2018/0337548 | A1* | 11/2018 | Beaver | H02J 50/12 |
| 2019/0363580 | A1* | 11/2019 | Nesgaard | E21B 41/0085 |
| 2020/0021147 | A1* | 1/2020 | Shijo | H01F 38/14 |
| 2022/0203849 | A1* | 6/2022 | Yu | B60L 53/124 |
| 2023/0188026 | A1* | 6/2023 | Yu | H02M 3/33569 |
| | | | | 363/17 |
| 2023/0420991 | A1* | 12/2023 | Yu | H02J 50/005 |
| 2025/0105640 | A1* | 3/2025 | Sanchez | B60W 40/08 |

FOREIGN PATENT DOCUMENTS

| | | |
|---|---|---|
| JP | 2013123306 A | 6/2013 |
| JP | 2014017893 A | 1/2014 |
| JP | 2020009972 A | 1/2020 |
| WO | 2019/108071 A1 | 6/2019 |

OTHER PUBLICATIONS

Kong, F.; "Coil Misalignment Compensation Techniques for Wireless Power Transfer Links in Biomedical Implants"; Master of Science thesis, Graduate Program in Electrical and Computer Engineering, Rutgers University, New Brunswick, New Jersey, Oct. 2015; pp. 1-69; Available on: https://rucore.libraries.rutgers.edu/rugers-lib/48468/PDF/1/play/Downloaded on May 16, 2022.

Abou Houran, M., et al.; "Magnetically Coupled Resonance WPT: Review of Compensation Topologies, Resonator Structures with Misalignment, and EMI Diagnostics"; Electronics Jul. 2018, 296, pp. 1-45.

Applicant: Intdevice Limited; "Inductive Power Transfer Transmitter and System"; International Application No. PCT/IB2022/053503 Filed Apr. 14, 2022; PCT International Search Report dated May 19, 2022; 4 pgs.

Intdevice Limited; "Inductive Power Transfer Transmitter and System"; European Application No. 22791205.2; Extended European Search Report dated Mar. 3, 2025; 8 pgs.

Japanese Patent Application No. JP2023-565197; Japanese Office Action dated Feb. 24, 2026; 3 pgs.

* cited by examiner

*Inductive power transfer transmitter* 35

*Tuning sub-circuit* 20

*Series tuned circuit* 22

*Primary coil* 18

24
*Secondary coil*

*Voc = Ipt\*M\*w*

36
*Inductive power transfer receiver*

*Inductive power transfer transmitter*
35

*Inductive power transfer transmitter*
35

(a)

(b)

INDUCTIVE POWER TRANSFER TRANSMITTER AND SYSTEM

FIELD OF THE INVENTION

The present invention relates to an inductive power transfer transmitter and an inductive power transfer system and method.

BACKGROUND OF THE INVENTION

Inductive power transfer is the transmission of electrical energy without a physical or wired connection. A typical inductive power transfer system comprises an inductive power transfer transmitter, or primary device, which generates an electromagnetic field, and which is used to transfer electric power across space to an inductive power transfer receiver, or secondary device, which extracts power from the field and supplies this to a load. A typical inductive power transfer transmitter is driven by an electric power source, and comprises an inverter, a primary tuning network, and a primary coil. A typical inductive power transfer receiver comprises a secondary coil, a secondary tuning network, a rectifier and a load.

The system uses a magnetic field to transfer electrical power wirelessly from the primary coil to a secondary coil. The magnetic field is created by inputting an AC current at the primary coil. The secondary coil, when placed in the magnetic field produced by the primary coil, generates an AC voltage across its terminals for driving or powering a connected load(s). Inductive power transmission can eliminate the use of wires and batteries, thus increasing the mobility, convenience, and safety of electronic devices.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of at least some preferred embodiments of the invention to provide a wireless power transmitter and system, and/or to at least provide the public with a useful alternative.

In one aspect, the present invention is an inductive power transfer transmitter comprising: an inverter sub-circuit comprising at least one inverter, and a tuned circuit comprising a plurality of components including at least: a transmitting coil, a first tuning network comprising: an inductor, and a capacitor, a second tuning network comprising a first additional component, wherein the plurality of components are arranged such that the tuned circuit can: vary current through the transmitting coil to compensate for variations in K coefficient, provide an output current from the inverter sub-circuit independent of a transmitting coil current.

Optionally, the output current from the inverter sub-circuit is different to the transmitting coil current.

Optionally, the output current from the inverter sub-circuit is less than the transmitting coil current.

Optionally, there is reduced power loss in the inverter sub-circuit.

Also described is, one or more of:
the first additional component
the inductor
the capacitor
is arranged in the tuned circuit such that it provides a flow of current for the transmitting coil current in addition to the inverter sub-circuit output current to provide sufficient current for the transmitting coil.

Also described, the first additional component is parallel to the transmitting coil to provide a source of current for the transmitting coil in addition to the inverter sub-circuit output current to provide sufficient current for the transmitting coil.

Also described, the inductor and/or capacitor is parallel to the transmitting coil to provide a source of current for the transmitting coil in addition to the inverter sub-circuit output current to provide sufficient current for the transmitting coil.

Also described, the output current from the inverter sub-circuit is less than the transmitting coil current, and the flow of current provided by the first additional component and/or the inductor and/or the capacitor provides current compensation by providing current equal to the difference between the transmitting coil current and the output current from the inverter sub-circuit.

Optionally, the tuned circuit further comprises at least one further additional component to improve power factor of power supplied from the inverter sub-circuit to the transmitting coil.

Optionally the at least one further additional component is a variable component to vary the power factor.

Optionally the variable component is a variable capacitor and/or a variable inductor.

Optionally, the inductor and/or capacitor and/or the first additional component are arranged in the tuned circuit to provide filtering.

Optionally, the tuned circuit can filter out harmonics in the output current from the inverter sub-circuit to improve EMI performance.

Optionally the variable component is a variable capacitor and/or a variable inductor.

Optionally the tuned circuit comprises a variable component that is a variable to vary the portion of current through transmitting coil.

Optionally the variable component is a variable capacitor and/or a variable inductor.

Optionally, the transmitting coil, the inductor, the capacitor, and the first additional component are each placed on a separate branch of the tuned circuit.

Optionally, the inductor is placed at the output of the inverter sub-circuit.

Optionally, the capacitor is placed at the output of the inverter sub-circuit.

Optionally, the branch the capacitor is located on intersects with the branch that the inductor is located on.

Optionally, the capacitor, the first additional component and the transmitting coil are connected in parallel.

Optionally, the inductor, the first additional component and the transmitting coil are connected in parallel.

Optionally, the plurality of components are arranged on the tuned circuit such that the tuned circuit can be remodelled as if the transmitting coil is series tuned so that the tuned circuit can vary current through the transmitting coil to compensate for variations in K coefficient.

Optionally, the first and second tuning networks together are Norton and Thevenin equivalent of a series tuned circuit to vary current through a transmitting coil to compensate for variations in K coefficient, while comprising one or more components, optionally parallel to the transmitting coil, to decouple the inverter from the transmitter coil.

Optionally, the tuned circuit can be remodelled by: applying Norton's theorem to transform a series connection of a voltage source (provided by the voltage of the inverter sub-circuit), the inductor and the capacitor into a parallel connection of a current source, the inductor and the capacitor, for creating an appearance of the first tuning network providing a current source for the transmitting coil, and applying Thevenin's theorem to transform a parallel connection of the current source, the first additional component, and the transmitting coil into a series connection of a voltage source, the first additional component and the transmitting coil, such that the transmitting coil appears series tuned.

Optionally, the inductor and capacitor each have an absolute reactance such that the absolute reactance of the inductor is substantially the same as the absolute reactance of the capacitor such that the combined impedance of the inductor and capacitor creates an appearance of an open circuit component so that the first tuning network appears to provide the current source to the transmitting coil.

Optionally, the first tuning network further comprises a second inductor.

Optionally, the second inductor is located at the output of the inverter sub-circuit, the second inductor located on a branch separate to the first inductor branch.

Optionally, the capacitor branch intersects with the first inductor branch at one end, and the second inductor branch at the other end.

Optionally, the tuned circuit can be remodelled by: applying Norton's theorem to transform a series connection of a voltage source (provided by the voltage of the inverter sub-circuit), the first and second inductors and the capacitor into a parallel connection of a current source, the first and second inductors and the capacitor, the inductors and the capacitor each have an absolute reactance such that the combined absolute reactance of the inductors is substantially the same as the absolute reactance of the capacitor such that the combined impedance of the inductors and capacitor creates an appearance of an open circuit component so that the first tuning network appears to provide the current source to the transmitting coil, and applying Thevenin's theorem to transform to transform a parallel connection of the current source, the first additional component, and the transmitting coil into a series connection of a voltage source, the first additional component and the transmitting coil, such that the transmitting coil appears series tuned.

Optionally, the first tuning network further comprises a second capacitor.

Optionally, the second capacitor is located at the output of the inverter sub-circuit, the second capacitor located on a branch separate to the first capacitor branch.

Optionally, the inductor branch intersects with the first capacitor branch at one end, and the second capacitor branch at the other end.

Optionally, the tuned circuit can be remodelled by: applying Norton's theorem to transform a series connection of a voltage source (provided by the voltage of the inverter sub-circuit), the first and second capacitors and the inductor into a parallel connection of a current source, the first and second capacitors and the inductor, the inductor and the capacitors each have an absolute reactance such that the combined absolute reactance of the capacitors is substantially the same as the absolute reactance of the inductor such that the combined impedance of the inductor and capacitors creates an appearance of an open circuit component so that the first tuning network appears to provide the current source to the transmitting coil, and applying Thevenin's theorem to transform to transform a parallel connection of the current source, the first additional component, and the transmitting coil into a series connection of a voltage source, the first additional component and the transmitting coil, such that the transmitting coil appears series tuned.

Optionally, the tuned circuit further comprises a second additional component.

Optionally, the second additional component is located on a branch that intersects with the branch that the capacitor is located on.

Optionally, the second additional component is located on a branch that intersects with the branch that the inductor is located on.

Optionally, the branch the first additional component is located on intersects with the branch that the second additional component is located on.

Optionally, the branch with transmitting coil is located on intersects with the branch that the first additional component is located on.

Optionally, the tuned circuit further comprises a third additional component.

Optionally, the third additional component is located on a branch separate to the second additional component branch, the third additional component branch intersecting with the capacitor branch at one end, intersecting with the first additional component branch at the other end.

Optionally, the third additional component is located on a branch separate to the second additional component branch, the third additional component branch intersecting with the inductor branch at one end, intersecting with the first additional component branch at the other end.

Optionally, one or more of:
the first inductor
the second inductor
the capacitor
the first additional component
the second additional component
the third additional component
are tunable or fixed in any combination.

Optionally, the first additional component is a a capacitor, and/or an inductor and/or a combination of one or more capacitors and one or more inductors.

Optionally, the second additional component is an inductor and/or a capacitor and/or a combination of one or more capacitors and one or more inductors.

Optionally, the third additional component is an inductor and/or a capacitor and/or a combination of one or more capacitors and one or more inductors.

In this specification, "high power application" means an application (of the inductive power transfer system) with a high-power rating. This high-power rating could be around 10 kW or more for example.

In this specification, "low power application" means an application (of the inductive power transfer system) with a low power rating. This low power rating could be around 10 kW or less for example.

In this specification, reference to "wireless charging of electric vehicles" relates to wireless charging of electric vehicle at big enough scale suitable for industrial/commercial use. This is different to home domestic wireless charging of electric vehicles, which may or may not have different design considerations to the inductive power transfer system described in this specification.

The term "capacitor" is a well understood term in the art. However, in this specification, a "capacitor" may also refer to any component that has a capacitive reactance. A "capacitor" may also refer to any combination of components (which may or may not include any capacitors) arranged such that the net reactance of the combination of components is capacitive, and can therefore be remodelled into a capacitor. A non-limiting example could be a combination of one or more capacitors and one or more inductors that electrically are equivalent to a capacitor.

The term "inductor" is a well understood term in the art. However, in this specification, an "inductor" may also refer to any component that has an inductive reactance. An "inductor" may also refer to any combination of components (which may or may not include any inductors) arranged such that the net reactance of the combination of components is inductive, and can therefore be remodelled into a inductor. A non-limiting example could be a combination of one or more capacitors and one or more inductors that electrically are equivalent to an inductor.

In this specification, the term "LCL tuning" refers to a type of tuning that can be applied on the primary/transmitting coil as well as on the secondary/receiving coil of an inductive power transfer system. An example of LCL tuning of the primary/transmitting coil is shown in FIG. 2C, where the first "L" in "LCL" refers to block 1 has a net inductive reactance, the "C" in "LCL" refers to block 2 having a net capacitive reactance, and the second "L" in "LCL" refers to block 3 having a net inductive reactance (which is provided by the inductance of the primary/transmitting coil). It is desirable for the reactance of each of blocks 1-3 to be same in absolute value. For example, blocks 1 and 3 each have an inductive reactance of +X and block 2 has a capacitive reactance of –X. Blocks 1 and 3 can optionally have series capacitors, but both blocks 1 and 3 should have a net inductive reactance despite both of them having capacitors.

In this specification, the term "series tuning"/"LC series tuning" refers to a type of tuning that can be applied on the primary/transmitting coil as well as on the secondary/receiving coil of an inductive power transfer system.

Although the inductive power transfer system described below can be used in a variety of applications, it should be noted the inductive power transfer system (including the described embodiments and the sub-circuits that make up the inductive power transfer system) have been designed to have a high power application, including for example, wireless charging of electric vehicles in an industrial/commercial setting (as opposed to a domestic setting). Such a design should be differentiated from inductive power transfer systems that only have a lower power application (such as wireless charging of electronic devices such like mobile phones for example), even if the electronic circuitry may appear similar on a circuit diagram. Inductive power transfer systems that have a high-power application have particular design considerations that are not applicable when designing an inductive power transfer system with a low power application. For example, an inductive power transfer system that has a high-power application will have significantly greater problems with heat dissipation and power efficiency, which at least in some cases cannot be adequately addressed using techniques known to a person skilled in the art. Some of these particular design considerations (and their respective solutions) will be discussed later on in the detailed description.

The term 'comprising' as used in this specification and indicative claims "consisting at least in part of". When interpreting each statement in this specification and indicative independent claims that includes the term 'comprising', features other than that or those prefaced by the term may also be present. Related terms such as 'comprise' and 'comprises' are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Embodiments will be described with reference to the following Figures, of which.

DETAILED DESCRIPTION

1. Overview of the Inductive Power Transfer System

An overview of an inductive power transfer system will first be provided to provide background information to the present invention described herein. Although the inductive power transfer system described below can be used in a variety of applications, it should be noted the inductive power transfer system (including the described embodiments and the sub-circuits that make up the inductive power transfer system) have been designed to have a high power application, including for example, wireless charging of electric vehicles in an industrial/commercial setting (as opposed to a domestic setting). Such a design should be differentiated from inductive power transfer systems that only have a lower power application (such as wireless charging of electronic devices such like mobile phones for example), even if the electronic circuitry may appear similar on a circuit diagram. Inductive power transfer systems that have a high power application have particular design considerations that are not applicable when designing an inductive power transfer system with a low power application. For example, an inductive power transfer system that has a high power application will have significantly greater problems with heat dissipation and power efficiency, which at least in some cases cannot be adequately addressed using techniques known to a person skilled in the art. Some of these particular design considerations (and their respective solutions) will be discussed later on in the detailed description.

Figure 1:
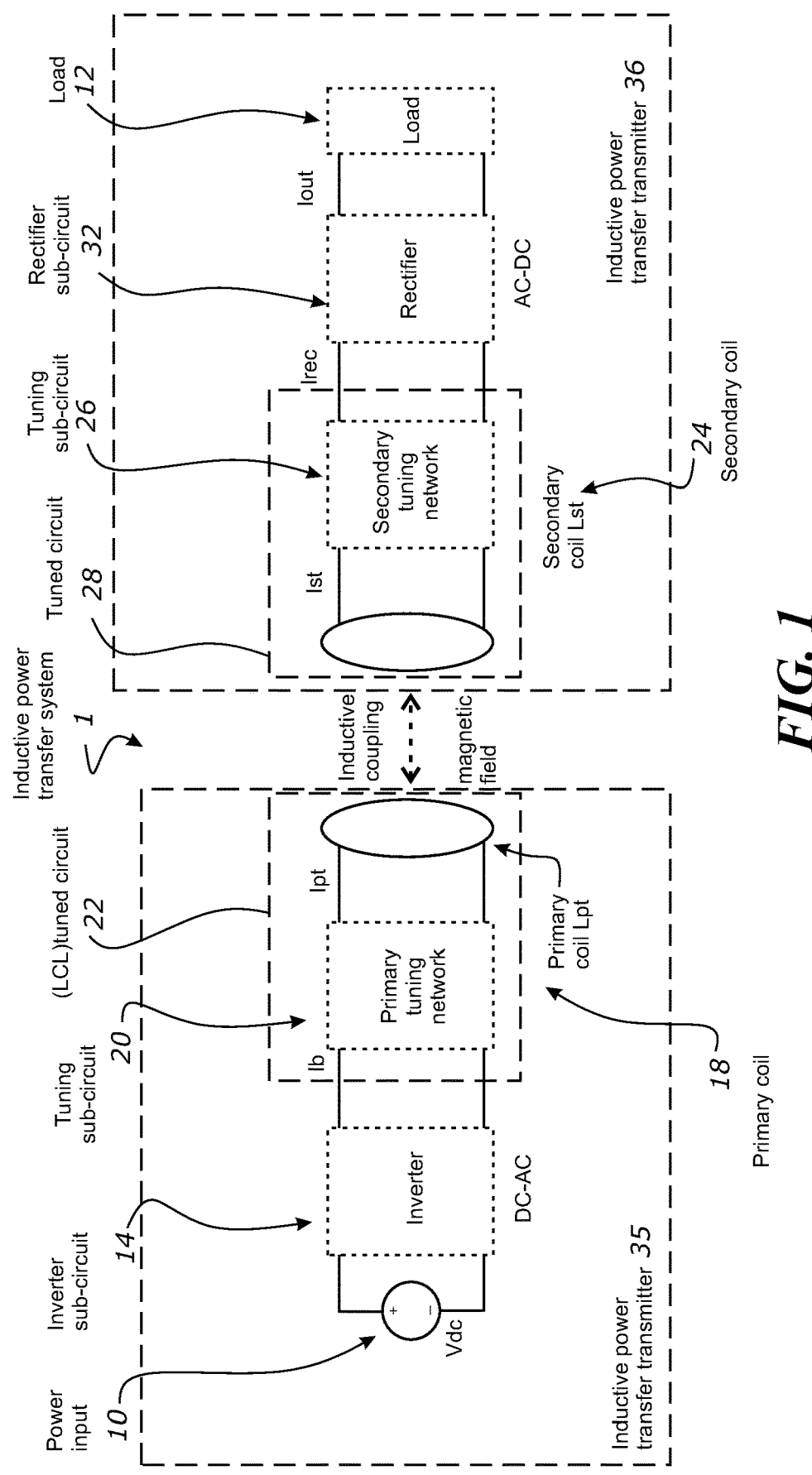
FIG. 1 shows an overview of an inductive power transfer system.

FIG. 1 shows an overview of an inductive power transfer system 1 that wirelessly transfers power from a power input 10 to power a load 12. The inductive power transfer system comprises an inductive power transfer transmitter 35 (also termed "primary device", "transmitter circuit", "transmitter side", "transmitter module") and an inductive power transfer receiver 36 (also termed "secondary device", "receiver circuit", "receiver side", "receiver module"). The inductive power transfer transmitter 35 is the portion of the inductive power transfer system 1 that wirelessly transfers power. The inductive power transfer receiver 36 is the portion of the inductive power transfer system 1 that wirelessly receives power.

Figure 2A:
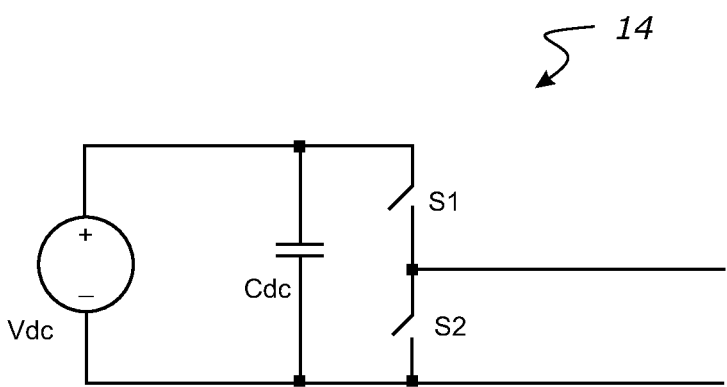
FIGS. 2A-B show different types of inverters.
Figure 2B:
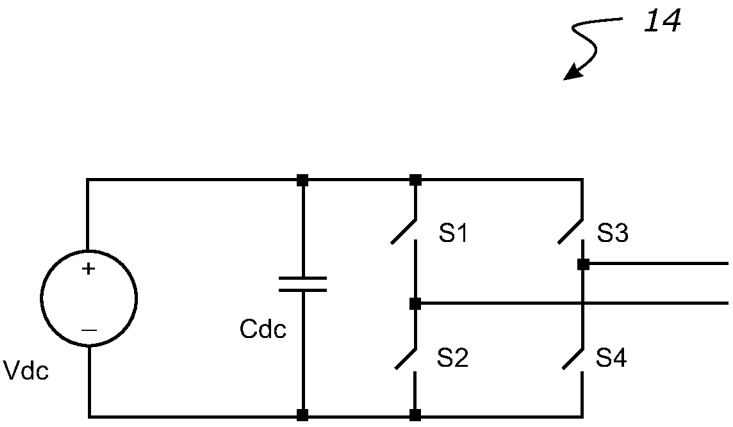
Figure 2C:
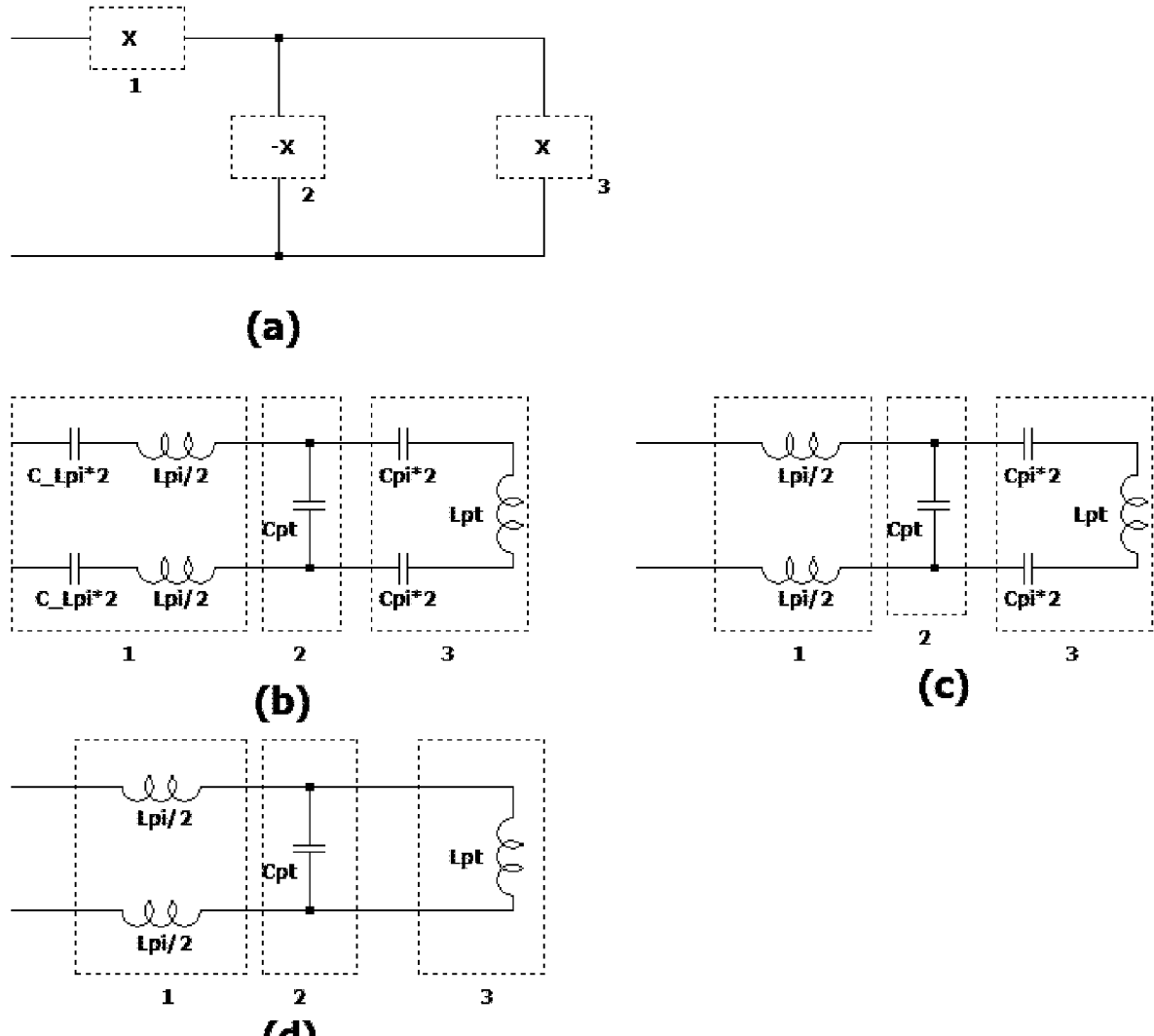
FIG. 2C show different types of LCL tuning.
Figure 3A:
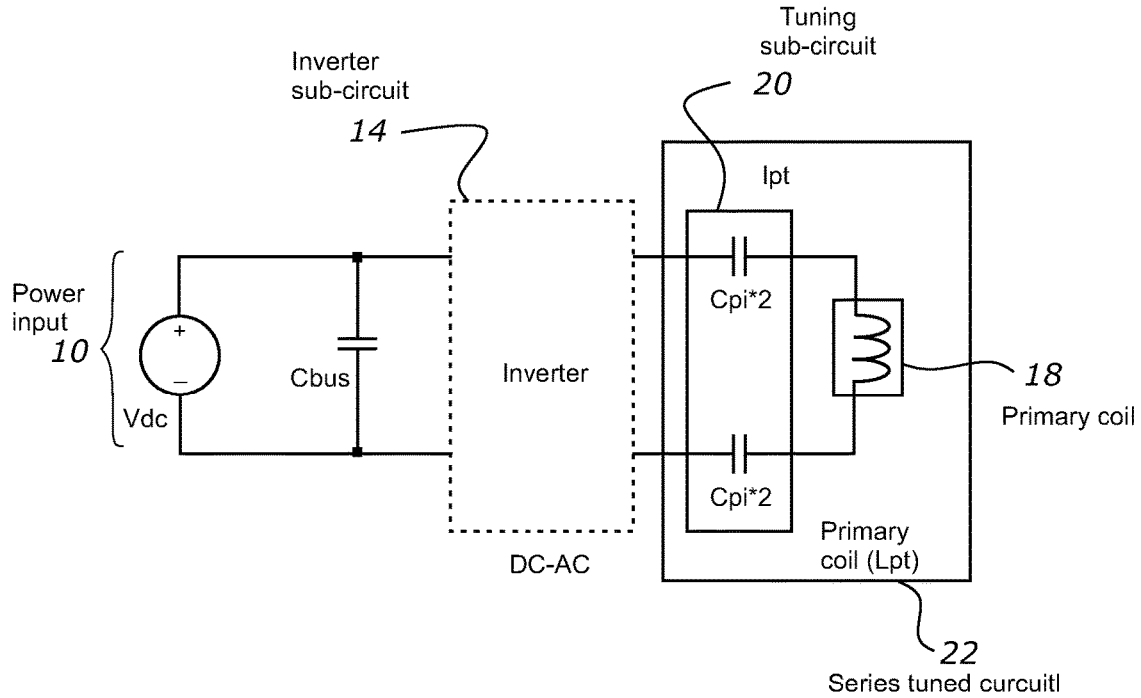
FIGS. 3A-B show different types of tuned circuits on the inductive power transfer transmitter side.
Figure 3B:
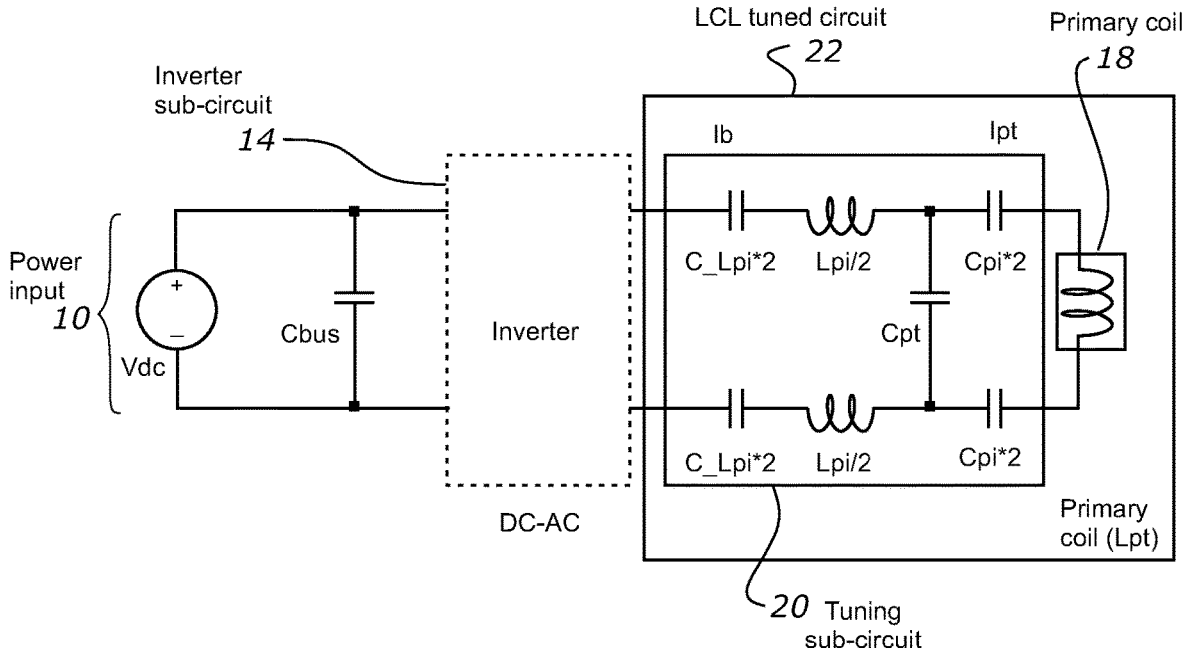

Referring first to the inductive power transfer transmitter 35. The inductive power transfer system 1 in the inductive power transfer transmitter 35 comprises a power input 10. The power input 10 could be a voltage and/or current input. For example, the power input 10 could provide a DC voltage that may be generated from a power factor correction (PFC) unit, a DC-DC converter, a battery, or other types of DC sources. The inductive power transfer system 1 in the inductive power transfer transmitter 35 also comprises an inverter sub-circuit 14, used for converting the direct current of the power input into an alternating current output. The inverter sub-circuit 14 comprises at least one inverter, but there could be two or more. The inverter/s making up the inverter sub-circuit 14 could be a half-bridge (FIG. 2A), a full-bridge (FIG. 2B), another switching mechanism, or a combination of the above. The inverter sub-circuit 14 can be considered a modular standalone component. A skilled person would understand that an inverter sub-circuit 14 is not necessary if the power input already has an alternating current. The inductive power transfer system 1 in the inductive power transfer transmitter 35 also comprises a primary coil 18 (interchangeable with "transmitting coil") used to wirelessly transmit power. The primary coil 18 may have multiple coils combined in series or in parallel but may be collectively referred to as "primary coil 18". The primary coil 18 is tuned by a tuning sub-circuit 20 to such that the primary coil 18 and the tuning sub-circuit 20 form a tuned circuit 22. The tuned circuit 22 can be considered to be modular. The tuned circuit 22 may be series tuned circuit (FIG. 3A for example) in which the tuning sub-circuit 20 has capacitors to tune the primary coil 18. Alternatively the tuned circuit 22 may be a (parallel) LC tuned circuit in which the tuning sub-circuit 20 has capacitors to provide tuning. However it is preferable that the tuned circuit 22 is an LCL tuned circuit (FIG. 3B for example). In an LCL tuned circuit 22, the tuning sub-circuit 20 provides the capacitors and inductors for the primary coil 18 to be LCL tuned circuit. The capacitors used for the LCL tuned circuit 22 are provided by the tuning sub-circuit 20. In addition to the primary coil 18, the inductors used for the LCL tuning 22 can be provided by the tuning sub-circuit 20.

Figure 4A:
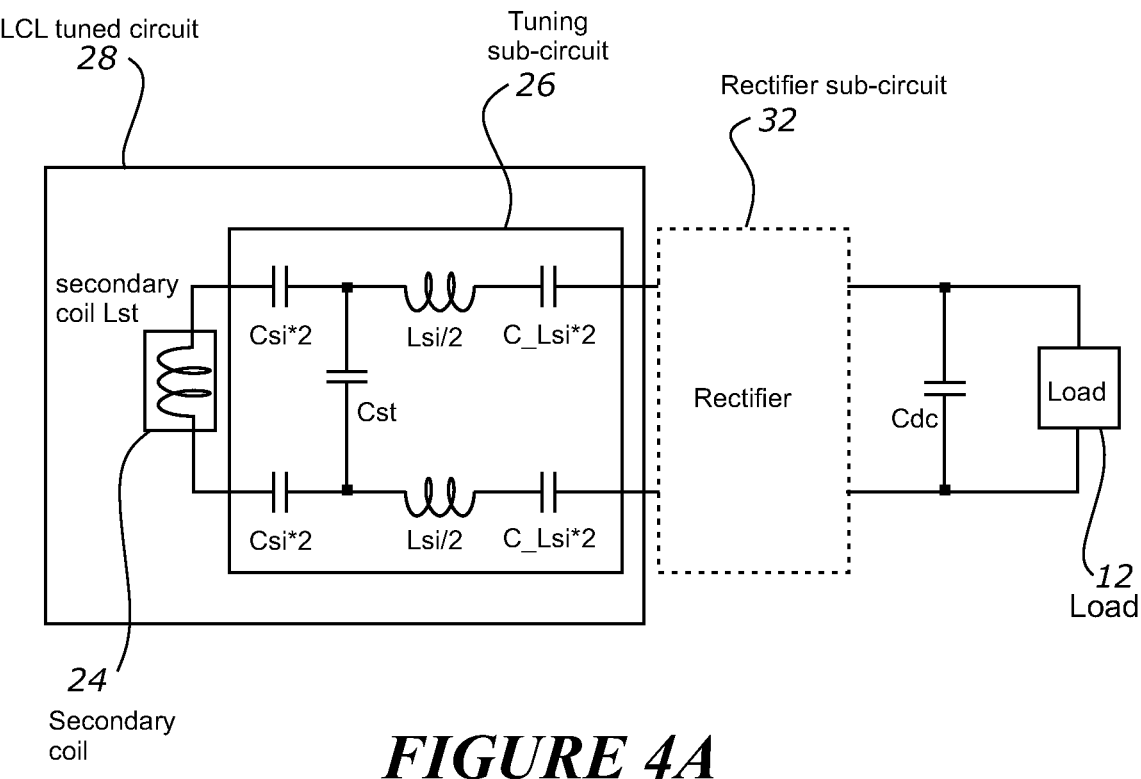
FIGS. 4A-B show different types of tuned circuits on the inductive power transfer receiver side.
Figure 4B:
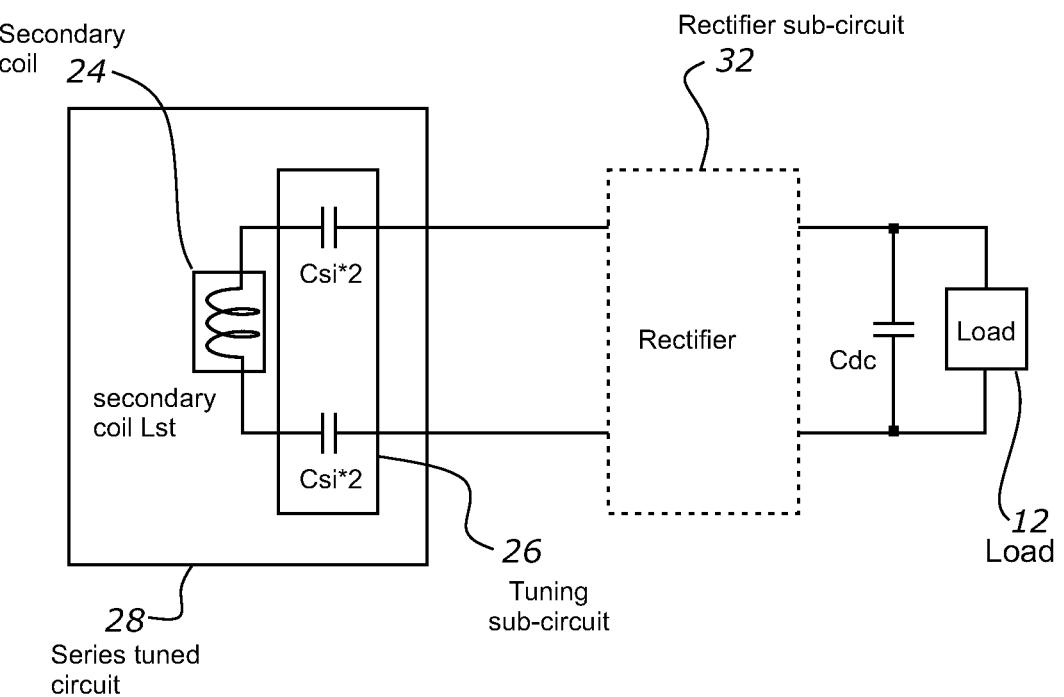

Now referring to the inductive power transfer receiver 36. The inductive power transfer system 1 in the inductive power transfer receiver 36 also comprises a secondary coil 24 (interchangeable with "receiving coil") for receiving power that has been wirelessly transmitted from the primary coil 18. The secondary coil 24 may have multiple coils combined in series or in parallel but may be collectively referred to as "secondary coil 24". Similar to the primary coil 18, the secondary coil 24 is tuned by a tuning sub-circuit 26 to form a tuned circuit 28. The tuned circuit 28 can be considered to be modular. The tuned circuit 28 may be an LCL tuned circuit (FIG. 4A for example) in which the tuning sub-circuit 26 has inductors and capacitors to provide tuning. Alternatively the tuned circuit 28 may be a (parallel) LC tuned circuit in which the tuning sub-circuit 26 has capacitors to provide tuning. However it is preferable that the tuned circuit 28 is a series tuned circuit (FIG. 4B for example). In a series tuned circuit 28, it is the tuning sub-circuit 26 that provide the capacitors for the secondary coil 24 to be series tuned. The inductive power transfer system 1 also comprises in the inductive power transfer receiver 36 a rectifier sub-circuit 32 for converting alternating current input into a direct current output. The rectifier sub-circuit 32 can be considered to be modular. The inductive power transfer system 1 also comprises in the inductive power transfer receiver 36 a load 12. A skilled person would understand that having a rectifier sub-circuit 32 is desirable in situations when providing direct current to the load 12 is desirable.

1.1 Power Transfer and Alignment

Inductive power transfer systems 1 such as that of which the present invention may form a part of, allow electrical energy to be transferred without physical contact. An inductive power transfer system 1 should be able to operate to produce a constant output for reception at the load 12. For example, this could be in order to achieve a good user experience for applications such as wireless charging of electric vehicles.

In the present embodiments, as will be described in more detail, this involves controlling the power the primary device provides from the primary coil 18 in response to changes in or at the secondary device 36. For example, such changes could relate to a certain amount of misalignment between the primary coil 18 and the secondary coil 24, and/or variations of the load 12 connected to the secondary device 36.

Inductive power transfer systems 1 transfer power optimally when the primary and secondary coils 18, 24 are properly aligned. Alignment is such that the secondary coil 24 is within the strongest portion of the electromagnetic field produced by the primary coil 18. Any misalignment between the primary and secondary coils 18, 24 can lead to less than optimal power transfer from the primary device 35 to the secondary device 36.

Misalignment can refer to the distance between the transmitter 35 and receiver 36 not being close enough and/or the orientation between the transmitter 35 and receiver 36 not being correct. For example, misalignment between the primary and secondary coils 18, 24 may occur, for example, because an electric vehicle may have a different ground clearance depending on its loading or it may be challenging to park such that the secondary coil 24, located in the electric vehicle, is well aligned with the primary coil 18 each time the electric vehicle is to be charged. As another example, there may be a tilt between the transmitter 35 and the receiver 36 such that misalignment occurs.

Misalignment between the primary and secondary coils 18, 24 can cause the magnetic coupling factor (k coefficient), between primary and secondary coils 18, 24 to vary. A change in the coupling coefficient k can subsequently cause the power at the secondary device 36 to change. The k change affects both power levels and efficiencies of wireless power transfer systems.

For example, the power at the secondary coil 24 and output increases with increasing values of magnetic coupling, for example, as the primary and secondary coils 18, 24 are better aligned. In other examples, using different types of tuning, the power at the secondary coil 24 may decrease as the coupling coefficient k (also termed" magnetic coupling factor") increases.

Inductive power transfer systems operate over a wide range of coupling factor k and load conditions. The change in coupling factor k is due to physical misalignments between primary and secondary coils 18,24 because it may be difficult to perfectly align both the transmitter and receiver coils 18, 24 for each charge and the vehicle ground clearance changes with loading and tyre pressure. Typically, the magnetic coupling factor (k coefficient) can change by a factor of 2 or more. For example, the k coefficient may change from for example a value of 0.15 at the furthest distance between the primary and secondary coils 18, 24, to a value of 0.3 at the closest position between the primary and secondary coils 18, 24, in the context of a wireless electric vehicle charging application.

Alternatively, the secondary device 36 may be varied in a way which does not relate to a misalignment of the coils 18, 24, but which causes more or less power to be required by or drawn by the secondary device 36. In one such example situation, the load 12 connected to the secondary device may be changed, which causes the amount of power drawn by the load 12 to also change. As such, the secondary device 36 may require more or less power to be drawn from the primary device 35 in order to provide sufficient power to the load 12 in response to this change.

2. K Coefficient Compensation

In an inductive power transfer system 1, the output power provided by the secondary device 36 preferably is kept constant, in order to maintain power to the load 12. Power control is therefore desired in order to maintain constant power at the output of the secondary device 36. Typically, this power control can be implemented on both the primary device 35 and the secondary device 36, for example to compensate for changes in the coupling coefficient k.

In terms of the ability to compensate for changes in coefficient k, inductive power transfer systems 1 can be divided into two groups depending on if power control is implemented on the secondary device 36 or not. We will discuss both.

2.1 K Coefficient Compensation without Power Control on the Secondary Device For systems 1 without power control on the secondary device 36, changes in power levels due to variation in k is typically compensated by adjusting primary coil current (Ipt) in the opposite direction of k change such that their product remains largely unchanged. That is, power control at the primary device 35 typically requires providing current to the primary coil 18 such that the power provided by the primary coil 18 varies in correlation with the changes in the system. For example, power control at the primary device 35 may take the form of controlling the current provided to the primary coil 18 in relation to change in the coupling coefficient k with the secondary coil 24, such that the product of these two variables i.e. the power received by the secondary device 36 from the primary device 35, stays largely unchanged.

For example, if the secondary coil 22 moves further away from the primary coil 18, the coupling coefficient k is decreased, and as such, the primary device 35 provides more current to the primary coil 18 in order to produce more power. This increase in power is in line with the change in coupling coefficient k. As such, the secondary device 36 does not see the effect of the change in coupling coefficient k, as the increased power from the primary coil 18 offsets the change in coupling coefficient k.

In order to transfer power wirelessly via the magnetic field, the transmitter 35 needs to inject an AC current (Ipt) in the transmitting coil Lpt to set up the magnetic field. The secondary coil needs to be placed in this magnetic field to receive energy wirelessly. More specifically, the magnetic field induces a voltage in series with secondary coil and is measured under an open-circuit condition. Therefore, it is typically known as the secondary coil open circuit voltage Voc.

$$V_{oc} = \Psi \times I_{pt} \times k \times \sqrt{L_{pt} \times L_{st}},$$

where Lpt and Lst are the primary and secondary coil inductances, $\Psi = 2nf$ and f is the operating frequency of the wireless power transfer system.

According to this definition, Voc is related to operating frequency, primary coil current, coupling factor k and coil inductances.

For a given secondary circuit, Voc determines the amount of power transferred from the primary to secondary. The primary circuit and pad can also be modelled as Voc.

Because coil inductances typically do not change significantly against misalignment and frequency is typically fixed or have a small range of variation (to maintain a good tuning condition) for EV charging application, Voc is directly controlled by the product of Ipt and k. Therefore, Voc and power level can be kept constant if we can keep the product of Ipt and k constant.

Due to misalignments, k typically may change by a factor of two or more, which means the primary coil current needs to change in the opposite direction by the same factor to maintain constant power.

2.1.1 LCL Tuned Primary Coil

For an LCL tuned primary, its primary coil current is defined as:

$$I_{pt} = V_{inv}/X,$$

where X is the characteristic impedance of the LCL network and equals to the absolute reactance of Cpt (FIG. 3)

or the combined reactance of all components between inverter and Cpt. In addition, Vinv represents the inverter output voltage.

Vinv is typically used to control primary coil current. It can be varied by either changing the input DC voltage (VDC) or phase shift percentage (θ) of inverter according to the following equation.

$$V_{inv} = \frac{\sqrt{8}}{\pi} \frac{V_{DC}}{\pi} \times \cos\left(\frac{\theta}{100} \times \frac{\pi}{2}\right)$$

where θ can change from 0 to 100% to decrease Vinv.

VDC is generated by either a single-phase or a three-phase power factor correction unit that has a very limited variation range (typically less than a factor of 1.3). So it cannot be used alone to change Vinv by a factor of two or more to compensate for large k changes for an LCL tuned primary.

Although inverter phase shift can be used to vary Vinv, operating at a large phase shift percentage (i.e. lower inverter output voltages) increases inverter currents, which leads to higher inverter conduction and switching losses and as a result lowers operating efficiency.

So it is difficult to vary the primary coil current over a large range to compensate for k change for an LCL tuned primary.

2.1.2 Series Tuned Primary Coil

For a series tuned primary, Vinv does not need to change as much as an LCL tuned primary in order to vary Ipt by a large factor. Therefore, it may be possible to rely on the limited variation in Vdc to compensate for power level changes due to the large k changes, and operate inverter with minimum phase shift of 0% to reduce switching and conduction losses. This concept is explained below with the help of FIG. 5, which shows a series tuned primary and a generalized secondary driven by Voc. On the secondary, the impedance Voc sees includes the secondary coil inductor in series with the rest of secondary circuits. It is denoted Z_Voc in this document. For efficiency reasons, Z_Voc is typically designed to be largely real. For simplicity, we will assume it is a resistor.

Figure 5A:
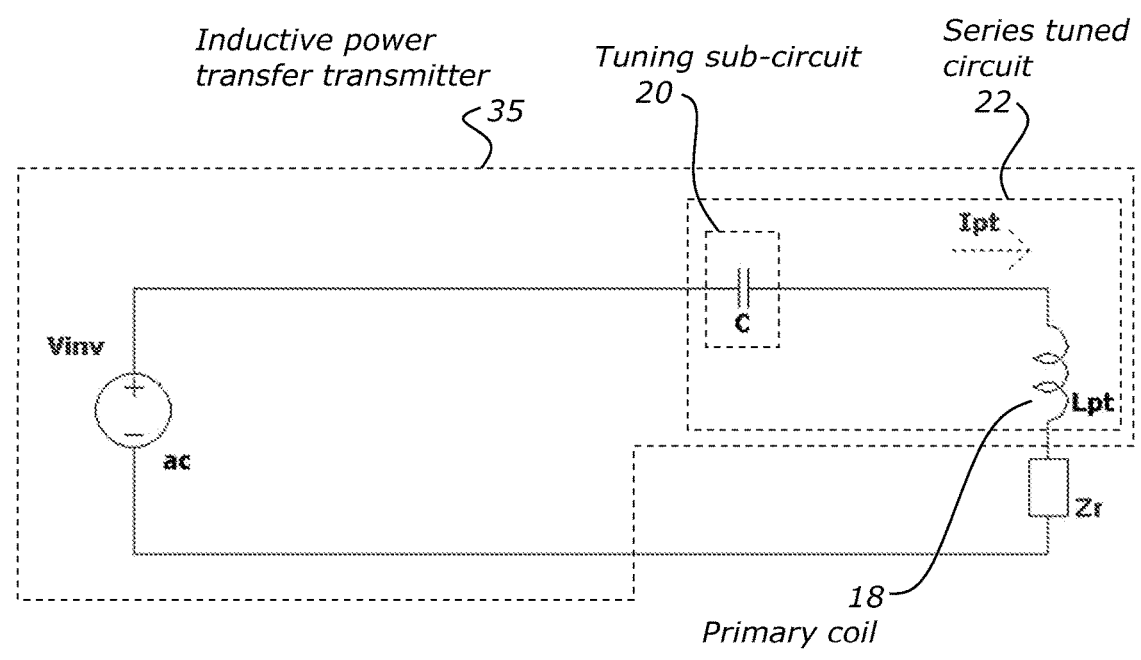
FIGS. 5A-B show the secondary side generalized.
Figure 5B:
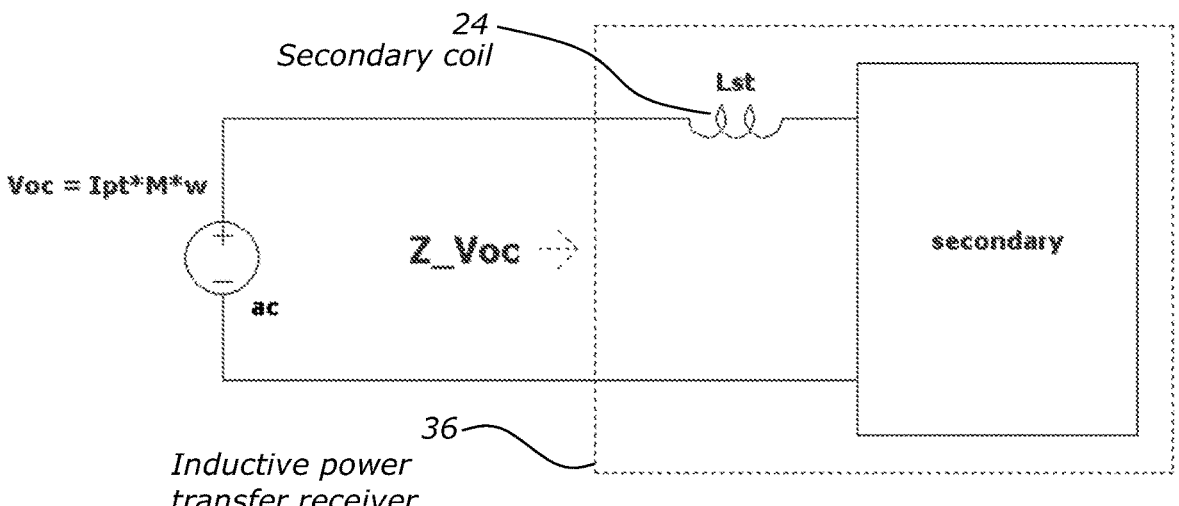

The secondary circuit can be represented and modelled using a reflected impedance Zr as shown in FIG. 5, where $$Z_r = \frac{\omega^2 k^2 L_{pt} L_{st}}{Z\_Voc}$$

Primary and secondary coil inductances (Lpt, Lst) typically do not vary significantly with k and frequency may also be fixed, for example for EV charging applications. Therefore according to this equation, Zr is larger for higher k and smaller for lower k values. If we assume Vinv to be fixed, it is clear that a higher Zr (as a result of higher k) causes the primary coil current to reduce and vice versa. This desirable relationship between Ipt and k is shown in the equation below, and it helps to stabilize Voc against a varying k (because Voc is a product of Ipt and k).

$$I_{pt} = \frac{V_{inv}}{\frac{1}{j\omega C} + j\omega L_{pt} + \frac{\omega^2 k^2 L_{pt} L_{st}}{Z\_Voc}}$$

Therefore, series tuned primary can compensate for change in k by automatically changing its primary coil current. It may be possible to design an IPT system with series tuned primary to fully compensate for a certain range of k change such that Voc and system power stays largely unchanged even with a fixed inverter output voltage. Practical limitations may reduce the effectiveness of such compensation so that Vinv may still need to vary by a small amount to help compensate.

However, series tuned primary has two major drawbacks that make it less attractive for high power applications. Firstly, high power applications typically require a large primary coil current. The series structure means this large current also has to flow through the inverter, potentially generating large losses there. Secondly, the series tuned network is a poor filter compared to the LCL network, which means more high order harmonics that are generated due to the normal operation of inverter can reach primary coil and radiate out into nearby space, creating potential EMI problems.

2.2 K Coefficient Compensation with Power Control on the Secondary Device

For systems with power control implemented on the secondary device 36, variations in k does not need to be fully compensated by primary coil current. The power control implemented on the secondary device 36 can partially adjust the output power level. However, implementing power control on the secondary device 36 adds cost and complexity to the secondary, which may be undesirable.

The large variations in k can also detune the system, causing higher reactive currents to flow in various components such as inverters, inductors and capacitors. This reduces system efficiency and increases costs by requiring components with larger current and voltage ratings and more expensive thermal management.

2.3 Transmitter Topology Design for Compensating for Changes in k Coefficient In the rest of the detailed description, we describe an topology of the inductive power transfer transmitter 35 that enables the primary coil current to vary automatically over a large range to compensate for k change (similar to a series tuned primary) so that the required inverter voltage range is reduced, while providing an output current from the inverter sub-circuit independent of the transmitting coil current (so that the topology is advantageous over an actual series tuned primary), and optionally achieve other outcomes, including one or more of the following for example:

achieve good efficiency (in terms of its ability to keep power factor of inverter output voltage close to 1)
    achieve good EMI performance
    achieve control over the current through the transmitting coil.

The above outcomes makes the inductive power transmitter 35 (that will be described hereon) advantageous over the various topologies of k coefficient compensation discussed above.

3. General Embodiment of the Inductive Power Transfer Transmitter

3.1 Overview

A general embodiment of the inductive power transmitter 35 will now be described. The general embodiment of the inductive power transmitter 35 may form a part of the inductive power transfer system 1.

Figure 6A:
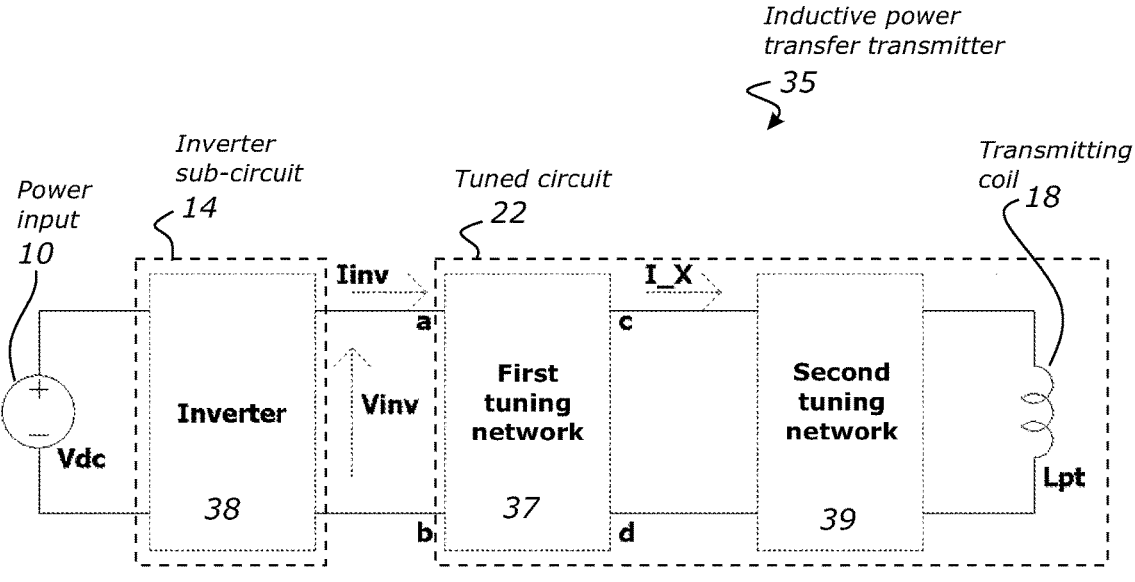
FIGS. 6A-B show an overview of the inductive power transfer transmitter.

FIG. 6A shows an overview of the inductive power transfer transmitter 35. The inductive power transfer transmitter 35 has a (DC) power input 10. The power input 10 connects to the inverter sub-circuit 14, which is for converting DC power (received from the (DC) power input 10) into AC power. The inverter sub-circuit 14 has one or more inverters 38. The inductive power transfer transmitter 35 also has a tuned circuit 22 comprising a plurality of components.

The tuned circuit 22 shown in FIG. 6A will now be discussed. The tuned circuit 22 shown in FIG. 6A comprises a transmitting coil 18, a first tuning network 37, and a second tuning network 39. At one end of the tuned circuit 22 is the first tuning network 37 (directly) located at the output of the inverter sub-circuit 14. At the other end of the tuned circuit 22 is transmitting coil 18. The second tuning network 39 is placed between the first tuning network 37 and the transmitting coil 18.

The purpose of the first and second tuning networks enables the tuned circuit 22 to be remodelled into a circuit equivalent of a transmitting coil 18 being series tuned, and as discussed in section 2.1.2 having a series tuned transmitting coil 18 means the tuned circuit 22 enables the automatic varying of the current through the transmitting coil 18 to compensate for changes in k coefficient:

The function of the first tuning network is to convert the voltage source Vinv(inverter output) to a current source (I_X) that flows into the second tuning network. As will be discussed later, the first tuning network comprises at least one inductor, and at least one capacitor.

The function of the second tuning network is to convert the current source (I_X) back into the second voltage source and the second tuning network is series tuned with the transmitting coil (Lpt) driven by the second voltage source. Although the second tuning network is shown to be in parallel with the transmitting coil (Lpt) in FIG. 6A, it is actually in series with the transmitting coil (Lpt) driven by the second voltage source. As will be discussed later, the second tuning network comprises at least one electronic component. For example, the electronic component could be, but not limited to, a resistor, an inductor, or a capacitor.

In this way, the structure in FIG. 6A has the k compensation character of a series tuned primary coil described in section 2.1.2, but the current in the inverter can be much smaller than the current in the transmitting coil (Lpt), as the first and second tuning networks of the tuned circuit 22 provide a current source for the transmitting coil (since these tuning networks each provide a branch providing a flow of current to the transmitting coil). That is, having both the first and second tuning networks 37, 39 between the inverter sub-circuit 14 and transmitting coil 18 'decouples' the inverter sub-circuit output current from the transmitting coil current, therefore making it possible to design the tuned circuit 22 to have independent inverter sub-circuit output and transmitting coil currents. That is, the currents can be the same and can also be different. This allows the current of the inverter sub-circuit output and the current of the transmitting coil to be designed independently. The tuned circuit 22 is therefore is particularly suitable for high power wireless systems that typically require large transmitting coil currents to set up large magnetic fields for power transfer and optimal (e.g. minimal) inverter currents to reduce inverter sub-circuit losses. The inverter sub-circuit output current can be easily designed to be much lower than the transmitting coil current (i.e. when the inverter sub-circuit has a high input voltage). This results in reduced power loss in the inverter sub-circuit. Such advantage realised in tuned circuit 22 is not possible for a series tuned primary, as the inverter output current is directly connected to the transmitting coil, which forces the inverter current to be the same as the transmitting coil current. This makes the tuned circuit 22 advantageous over an actual series tuned transmitting coil.

Figure 6B:
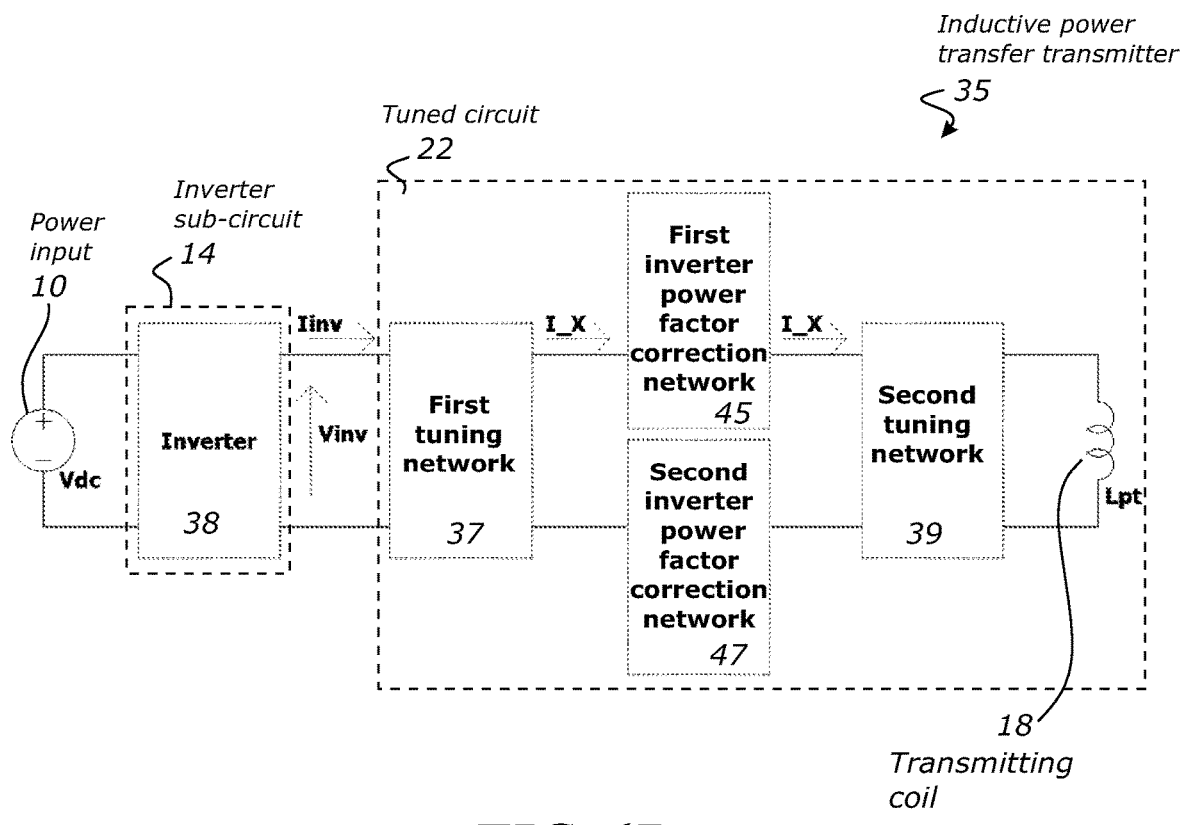

FIG. 6B shows one embodiment of FIG. 6A by way of example. The tuned circuit 22 embodiment in FIG. 6B is similar to the tuned circuit 22 of FIG. 6B, except the tuned circuit embodiment 22 also includes one or more inverter power factor correction networks 45, 47 inserted between the first and second tuning networks to help improve power factor of the inverter. Such networks are considered placed in series with the first current source (which is the voltage source transformed by the first tuning network). This inverter power factor correction networks decouples inverter power factor control from power control as the first constant current source is not affected by changes in inverter power factor correction networks. Both the first and second power factor correction networks 45, 47 each comprise one or more components for improving the power factor of power supplied from the inverter sub-circuit 14. Both the first and second power factor correction networks 45, 47 are optional and are not essential to have in a tuned circuit 22.

Various embodiments of the tuned circuit 22 will be described next. As will be apparent later, the embodiments of the tuned circuit 22 described herein comprises in the first tuning network at least one inductor and at least one capacitor. The tuned circuit embodiments described herein also comprise in the second tuning network at least one additional component 44. The tuned circuit 22 embodiments described herein also comprise a transmitting coil 18.

Figure 6C:
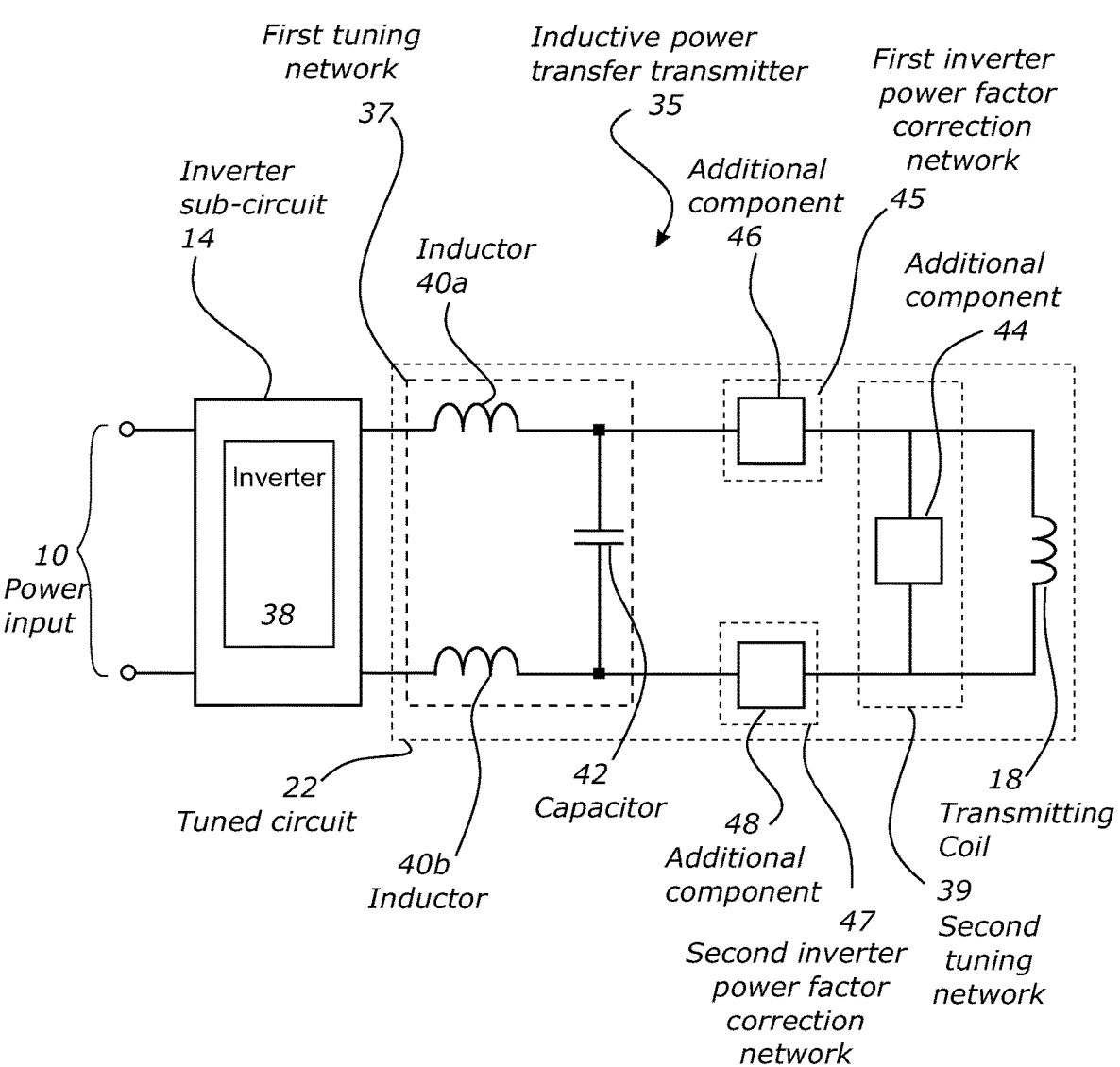
FIG. 6C shows a first general embodiment of the inductive power transfer transmitter.
Figure 6D:
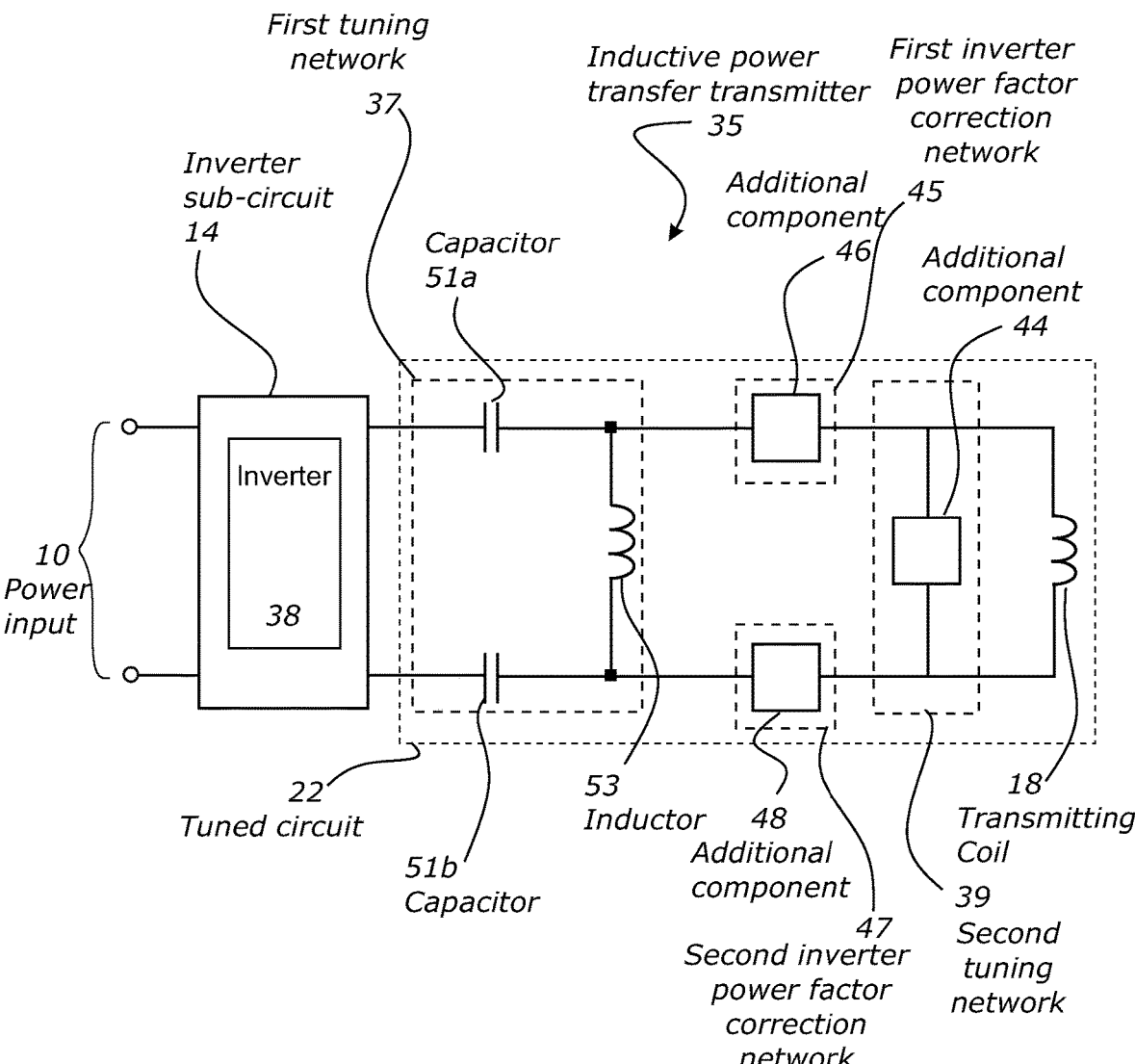
FIG. 6D shows a second general embodiment of the inductive power transfer transmitter.

The various embodiments described herein fall into one of two general embodiments. The first general embodiment is shown in FIG. 6C, and the second general embodiment is shown in FIG. 6D. The difference between the first and second general embodiments lies within their respective first tuning networks 37, with the positions of the inductors and capacitors in the first tuning network effectively being "swapped around":

With reference to FIG. 6C, the first tuning network of the first general embodiment has at least one inductor placed at the output of the inverter sub-circuit 14. There is also at least one capacitor located on a separate branch to the inductor/s. Based on the relative positions of the inductor and capacitor, this general embodiment may be termed as an "LC embodiment".

In contrast, with reference to FIG. 6D, the first tuning network of the second general embodiment has at least one capacitor placed at the output of the inverter sub-circuit 14. There is also at least one inductor located on a separate branch to the capacitor/s. Based on the relative positions of the inductor and capacitor, this general embodiment may be termed as an "CL embodiment".

4. First (LC) General Embodiment of the Tuned Circuit

4.1 Overview

The first general embodiment of the tuned circuit will now be introduced with reference to FIG. 6C.

The tuned circuit 22 according to the first general embodiment will first be described at a "block level".

The tuned circuit 22 shown in FIG. 6C has a transmitting coil 18, a first tuning network 37, a second tuning network 39, a first inverter power factor correction network 45, and a second power factor correction network 47. At one end of the tuned circuit 22 is the first tuning network 37 (directly) located at the output of the inverter sub-circuit 14. At the other end of the tuned circuit 22 is transmitting coil 18. The second tuning network 39 is placed between the first tuning network 37 and the transmitting coil 18. The first and second inverter power factor correction networks 45, 47 are placed between the first tuning network 37 and the second tuning network 39.

The tuned circuit shown in FIG. 6C comprises:
- a first tuning network 37 comprising inductors 40a and inductor 40b, and capacitor 42
- a second tuning network comprising additional component 44
- a first inverter power factor correction network comprising at least additional component 46
- a second inverter power factor correction network comprising at least additional component 48
- a transmitting coil 18.

The components that form the tuned circuit of FIG. 6C will now be described in more detail.

The tuned circuit 22 has inductors 40a and 40b placed at the output of the inverter sub-circuit 14. The inductors 40a and 40b are placed on separate branches. Either inductor 40a,b can be tunable so that its inductance can be varied. The tuned circuit 22 also has a capacitor 42 that connects between inductors 40a and 40b. The capacitor 42 can be tunable so that its capacitance can be varied. The tuned circuit 22 has three parallel branches with the capacitor 42, the additional component 44, and the transmitting coil 18 connected in parallel with each other. The tuned circuit 22 also has additional components 46 and 48 that are connected between the parallel branches of the capacitor 42 and the additional component 44. The additional components 46 and 48 are placed on separate branches to each other.

Additional components 44, 46, 48 are components each with an impedance that is resistive and/or reactive. For example any of additional components 44, 46, 48 can be a resistor, a capacitor, or an inductor. Any of additional components 44, 46, 48 can have a fixed impedance. Alternatively, any of additional components 44, 46, 48 may be tunable such that its impedance can be varied. If any of additional components 44, 46, 48 has a resistive impedance, the additional component can be tuned to vary its resistance. If any of additional components 44, 46, 48 has a reactive impedance, the additional component can be tuned to vary its reactance. The reactance can be varied between being inductive and capacitive.

While additional components 44, 46, 48 can have a resistive impedance, it is preferable that these components have a reactive impedance only, or at least have minimal resistance. It is therefore preferable for additional components 44, 46, 48 to be a capacitor or an inductor as opposed to being a resistor. More preferably, additional component 44 is a capacitor, and additional components 46, 48 are inductors; such that additional components 44, 46, 48 provide filtering to filter out higher order harmonics generated from the inverter sub-circuit output and/or improve power factor of power output from the inverter sub-circuit. Further, it is even more preferable that additional component 44 is a capacitor with a tunable capacitance. Having additional component 44 as a variable capacitor assists with filtering out higher order harmonics generated from the inverter sub-circuit output and/or improves power factor of power output from the inverter sub-circuit. Having additional component 44 as a variable capacitor also assists with the ability to control current provided to the transmitting coil 18.

For the first general embodiment of the tuned circuit 22, it is not essential to have all the components shown in FIG. 6C. However, in this general embodiment, the tuned circuit 22 should at least include: the transmitting coil 18, a first tuning network 37 comprising at least: one inductor (either inductor 40a or 40b is fine but both inductors 40a,b may optionally be incorporated), and one capacitor (such as capacitor 42 for example) and a second tuning network 39 comprising additional component 44, and a further additional component which could be either additional component 46 or additional component 48 (but both additional components 46, 48 may optionally be incorporated). This is so that the tuned circuit 22 can vary current through the transmitting coil to compensate for variations in K coefficient. Preferably the tuned circuit 22 also has additional components (like components 46, 48 for example) to improve power factor of power supplied to the transmitting coil, and/or provide control over the current through the transmitting coil 18. This will be discussed in more detail in the next section.

4.2 Design Considerations

Various design considerations of the first general embodiment of the tuned circuit 22 will now be discussed. The design considerations include:
- varying the primary coil current automatically over a large range to compensate for k change (similar to a series tuned primary) so that the required inverter output voltage range is reduced, while providing an output current from the inverter sub-circuit independent of the transmitting coil current (which is advantageous over a series tuned primary)
- achieving improved EMI performance
- achieving improved efficiency (in terms of its ability to keep power factor of inverter output voltage close to 1)
- controlling transmitting coil current.

Each of these advantages are described in the context as being able to provide an advantage over the tuned circuit topologies discussed in sections 2.1 and 2.2. Each advantage will be discussed in detail separately.

4.2.1 Automatic Varying of the Primary Coil Current to Compensate for Changes in k Coefficient The inductive power transmitter 35 desirably has a tuned circuit 22 comprising a plurality of components that are arranged such that the tuned circuit 22 can be remodelled, through a combination of Thevenin and Norton circuit analysis, into a series tuned primary coil arrangement. By enabling the tuned circuit 22 to be remodelled into a series tuned primary coil arrangement, the tuned circuit 22 is able to automatically adjust the current through the primary coil 18 in response to changes in the k coefficient in the same way as discussed above in section 2.1.1.

To achieve this desired outcome, the first general embodiment of tuned circuit 22 should have at least a first tuning network 37 comprising at least: an inductor (and in the example of FIG. 6C having either inductor 40a or inductor 40b is sufficient), and a capacitor 42, and a second tuning network 39 comprising: a first additional component 44, and a second additional component (which could be either additional component 46 or 48). It is optional having two inductors but it is not essential. It is optional having additional components 46, 48 but it is not essential.

For the rest of this section, explanation of how the components in the first and second tuning networks 37, 39 enable the first general embodiment of tuned circuit 22 to provide automatic varying of the transmitting coil current to compensate for changes in k coefficient.

The inductor and capacitor (in the first tuning network 37) enable Norton's theorem to be applied to transform the tuned circuit 22 from a series connection of a voltage source (provided by the voltage of the inverter sub-circuit), an inductor and a capacitor into a (circuit equivalent) parallel connection of a current source, an inductor and a capacitor. By having a (circuit equivalent) parallel connection of a current source, an inductor and a capacitor, the combined impedance of the inductor and capacitor creates an appearance of a large impedance (preferably an open circuit appearance) for the parallel connected current source (for example when the absolute reactance of the inductor and capacitor is similar). Preferably, the absolute capacitive reactance of the capacitor is substantially equal to the absolute inductive reactance of the inductor, or to the absolute combined inductive reactance of the inductors if both inductors 40a,b are used in the tuned circuit 22. Therefore, the first tuning network 37 becomes a constant current source.

Following the transformation provided by the first tuning network 37 into a constant current source, the tuned circuit 22 can be transformed further by applying Thevenin's theorem. This is made possible because of the existence of the first additional component 44 (in the second tuning network 39). Thevenin's theorem is applied to transform the parallel connection of the current source, the first additional component 44, and the transmitting coil 18 into a (circuit equivalent) series connection of a voltage source, the first additional component 44, and the transmitting coil 18. The (circuit equivalent) series connection provides the appearance of the transmitting coil 18 being series tuned, and as discussed in section 2.1.2 having a series tuned transmitting coil 18 means the tuned circuit 22 enables the automatic varying of the current through the transmitting coil 18 to compensate for changes in k coefficient.

Further, in the first general embodiment of the tuned circuit 22, the first tuning network 37 has a capacitor 42 connected such that it provides a flow of current to the transmitting coil 18, and the second tuning network 39 has an additional component 44 such that it provides a flow of current to the transmitting coil 18. The flow of current each provided by the capacitor 42 and the additional component 44 is in addition to the current provided from the output of the inverter sub-circuit. This means the current output of the inverter sub-circuit is independent to the transmitting coil current. That is, it is not necessary for the inverter sub-circuit 14 to match the current through the transmitting coil 18, and is allowed to be different. In contrast, in an actual series tuned transmitting coil circuit, the inverter sub-circuit will always be the same as the transmitting coil current.

This difference provides the tuned circuit 22 with an advantage over an actual series tuned transmitting coil circuit, and can be explained as follows. The tuned circuit 22 design allows the transmitting coil current is sourced from the inverter sub-circuit output but also have current sourced from current flowing through the capacitor 42 and/or current flowing through additional component 44. By sourcing some of the transmitting coil current from other components, and not solely from the inverter sub-circuit output, the inverter sub-circuit output current can be designed to be less than the transmitting coil current. This allows the inverter sub-circuit output current to be reduced. In turn this reduces the power loss in the inverter sub-circuit. This explained advantage is especially applicable for high power applications, however a skilled person will appreciate that the explained advantage can also be implemented even if a high power application is not being considered.

As described, the current flowing out of the first tuning network 37 can be considered a current source whose magnitude is determined by I_X=Vinv/X, where X is impedance of inductor/s (e.g. inductors 40a and/or 40b) or capacitor 42. This magnitude remains unchanged regardless of how the rest of circuit changes. Therefore, the first tuning network can be considered a constant current source. If we ignore additional components 46 and 48 (because they are in series with the current source), the current source flows into both additional component 44 and transmitting coil 18. However, the current distribution between additional component 44 and transmitting coil 18 is entirely dependent on the impedance of additional component 44, impedance of the transmitting coil 18, and the reflected impedance, which changes with power. The current in the inverter I_inv=Power/Vinv with a unit power factor, Vinv can be changed by the input voltage for the inverter sub-circuit and phase shift. Therefore, the current in the inverter sub-circuit is independent of current in the primary coil.

In some embodiments, there may be one or more capacitors connected in series with an inductor in the first tuning network 37. Alternatively, or additionally, there may be one or more inductors connected in series with the capacitor in the first tuning network 37.

Figure 12A:
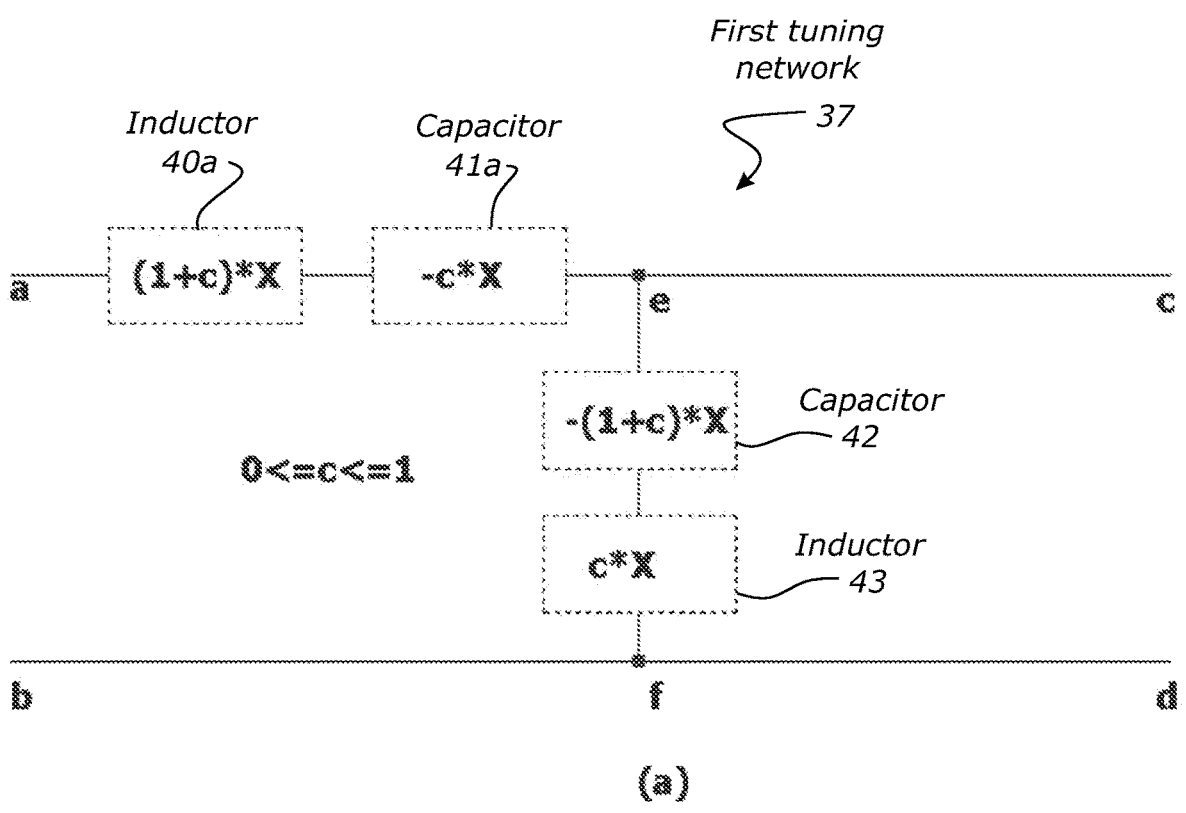
FIG. 12A shows an exemplary embodiment of a first tuning network of the first general embodiment of the tuned circuit.

FIG. 12A shows a generic example of this, where the first tuning network 37 has at least an inductor 40a and a capacitor 42, and (depending on the value of c) may also have a capacitor 41a connected in series with inductor 40a, as well as an inductor 43 connected in series with capacitor 42. In such a situation, it is desirable that the combined reactance of the components at the output of the inverter sub-circuit 14 is substantially the same as the combined reactance of the components connected in parallel with the transmitting coil 18 so that the first general embodiment of tuned circuit 22 can be remodelled as a series tuned transmitting coil such that K compensation is provided through automatic varying of current.

One example of this can be seen in FIG. 12A, where the combined reactance between terminals a and e is X, indicating that the combined impedance is inductive. Note constant c ranges from 0 to 1. When c=0, an inductor (with an reactance of –X) is connected between terminals a and e and a capacitor (with an reactance of –X) is connected between terminals e and f. When C>0, both the inductor and capacitor are present between these terminals. The combined reactance between terminals e and f is –X, indicating that the combined impedance is capacitive. A portion of the reactance X (between a and e) may also be shifted to be between terminals b and f provided that the sum of reactance between terminals a and e and terminals b and f is X.

In the context of this general embodiment, arranging the components in the tuned circuit 22 to produce LCL tuned transmitting coil, or a circuit equivalent of an LCL tuned transmitting coil should be avoided for reasons discussed in section 2.1.1. It also prevents the tuned circuit 22 from being transformed into a series tuned transmitting coil to realise the advantage of automatic varying of the transmitting coil current to compensate for changes in k coefficient. Referring to the example of FIG. 6C, if any of the capacitor 42, the first additional component 44, or second additional component (which could be either additional component 46 or additional component 48) is omitted from the tuned circuit 22, then the tuned circuit 22 would look like an LCL tuned transmitting coil (or a circuit equivalent thereof), which is undesirable as such a circuit arrangement cannot provide automatic varying of the primary coil current to compensate for changes in k coefficient.

Further specific information can be found in section 4.3.1, and in particular, the accompanying description to FIGS. 8A-F. While section 4.3.1 is described in the context of a first exemplary embodiment, a skilled person will recognise that the principles discussed in section 4.3.1 also apply to this general embodiment as well as the other exemplary embodiments.

4.2.2 Improved EMI Performance

It is also desirable for the inductive power transfer transmitter 35 to have a tuned circuit 22 comprising a plurality of components that are arranged such that the tuned circuit 22 improves EMI performance in the inductive power transfer transmitter 35. As discussed in section 2.1.2, having a tuning circuit with a series tuned transmitting coil is problematic because the tuning circuit provides poor filtering, so it does not adequately address the issue of high order harmonics that are generated from the inverter sub-circuit 14, which leads to issues in EMI performance. It is therefore desirable that the tuned circuit 22 acts as a filter to filter out high order harmonics that are generated from the inverter sub-circuit 14, or at least provide better filtering than what can be achieved from a tuning circuit with a series tuned circuit, in order to provide the inductive power transfer transmitter 35 with improved EMI performance.

It is therefore preferable to have in the tuned circuit 22 an inductor (having either inductor 40a or inductor 40b is sufficient) and capacitor 42 for the purpose of providing improved filtering. Having an inductor placed at the output of the inverter sub-circuit 14 together with the capacitor 42 provides a filter to divert high order harmonics away from the transmitting coil 18, thus improving EMI performance in the inductive power transfer transmitter 35.

It is preferable that both inductors (i.e. inductor 40a and inductor 40b) are used together with capacitor 42 to filter out the high order harmonics. It is also preferable that the first additional component 44 is capacitive. It is preferable that the second additional component (which could be either additional component 46 or additional component 48) in the tuned circuit is an inductor. Even more preferable is that both additional components 46 and 48 are present in the tuned circuit 22 with both additional components being inductors.

4.2.3 Improved Power Factor

It is also desirable for the inductive power transfer transmitter 35 to have a tuned circuit 22 comprising a plurality of components that are arranged such that the tuned circuit 22 can improve power factor of power provided from the inverter sub-circuit 14 to improve power efficiency of the inverter sub-circuit 14. In this context, the improved power factor refers to the inverter sub-circuit output power factor is brought closer to unity. A unity power factor means output current of the inverter sub-circuit is in phase with the output voltage of the inverter sub-circuit, such that the RMS value of the inverter sub-circuit output current is minimal for a given power level that the inverter sub-circuit outputs.

To achieve this desired outcome, the tuned circuit 22 may have either additional component 46 or additional component 48, although it is not essential, to improve the inverter power factor towards unity, or make the overall impedance of the tuned circuit 22 (slightly) inductive. Optionally, the tuned circuit can have both additional component 46 and additional component 48 to improve the inverter power factor towards unity, or make the overall impedance of the tuned circuit 22 (slightly) inductive. The impedance of additional component 46 and/or additional component 48 is preferably adjustable.

The components in the tuned circuit 22 can optionally be tunable for the purpose of improving power factor. For example, one or more of: inductor 40a, inductor 40b, capacitor 42, additional component 44, additional component 46, and additional component 48 can be tunable. That is, their respective impedance can be tuned to improve power factor of power provided to the transmitting coil 18.

4.2.4 Control of Transmitting Coil Current

It is also desirable for the inductive power transfer transmitter 35 to have a tuned circuit 22 comprising a first additional component 44 that is a variable, such as a variable capacitor or inductor. Since the total current flowing into additional component 44 and transmitting coil 18 is fixed by the constant current source provided by the first tuning network 37, varying the impedance of additional component 44 varies the portion of current (provided from the first tuning network 37) to flow through transmitting coil 18.

4.3 Exemplary Embodiments of the Inductive Power Transfer Transmitter

Discussion now turns to exemplary embodiments that fall within the scope of the first general embodiment of the tuned circuit 22. More generally, these exemplary embodiments fall within the scope of the general embodiment of the inductive power transfer transmitter 35.

4.3.1 First Exemplary Embodiment

The first exemplary embodiment of the inductive power transfer transmitter will now be described with reference to FIGS. 7 and 8A-F. The first exemplary embodiment shown in FIGS. 7 and 8A-F comprises the following features:

inductive power transfer transmitter 135, which corresponds to inductive power transfer transmitter 35 power input 110, which corresponds to power input 10 inverter sub-circuit 114, which corresponds to inverter sub-circuit 14 inverter 138, which corresponds to inverter 38 tuned circuit 122, which corresponds to tuned circuit 22 first tuning network 137, which corresponds to first tuning network 37 second tuning network 139, which corresponds to second tuning network 39 first inverter power factor correction network 145, which corresponds to first inverter power factor correction network 45 second inverter power factor correction network 147, which corresponds to second inverter power factor correction network 47 inductor 140a ("L1A"), which corresponds to inductor 40a inductor 140b ("L1B"), which corresponds to inductor 40b capacitor 141*a* ("C1A"), which corresponds to capacitor 41*a* capacitor 141*b* ("C1B"), which corresponds to capacitor 41*b* capacitor 142 ("C2"), which corresponds to capacitor 42 capacitor 144 ("C3"), which corresponds to first additional component 44 tunable impedance 146 ("X2A"), which corresponds to second additional component 46 tunable impedance 148 ("X2B"), which corresponds to third additional component 48.

Features of the first exemplary embodiment are as follows:

The inverter operates at a fixed frequency f. (but not limited to fixed frequency)

The combined impedance of L1A, L1B, C1A and C1B is (substantially) +X at frequency f.

The impedance of C2 is (substantially) −X at frequency f.

Tunable impedances X2A and X2B are variable reactive elements that can be either inductive or capacitive or change between capacitive and inductive. Their unique position in the circuit allows them to effectively control the power factor of inverter output voltage Vinv without affecting the power level of the system. The power factor can be determined by measuring the phase difference between Vinv and Iinv or the phase difference between Iinv and I_X2. The impedance of X2A and X2B can then be adjusted to improve the inverter power factor towards unity, or make the overall impedance of the tuned circuit slightly inductive.

X2A and X2B may each be realized with a variable capacitor, a variable inductor, a fixed inductor in series with a variable capacitor, a variable inductor in series with a fixed capacitor or any other combinations of variable or fixed inductors and capacitors.

The input DC voltage can be varied to control primary coil current Ipt and power.

The inverter phase shift can also be varied to control primary coil current Ipt and power.

The tuning topology can work with either an LCL tuned, series tuned secondary or any other secondary topologies.

The tuning network is a better harmonic filter than LCL and series tuning topologies at preventing higher order harmonics generated at the inverter from reaching primary coil and radiating out. Therefore, it has better EMI performance than LCL or series tuned primary.

Capacitors C1A, C1B, C4A and C4B are optional.

Either capacitor C1A or C1B can be placed in series with L1A or L1B respectively. Using one or both of these capacitors can be helpful reducing the overall net inductance from L1A and L1B so that the overall net inductance can substantially negate the capacitance of C, which will be discussed later in this section.

Either capacitor C4A and C4B can be placed in series with the transmitting coil. Adding these capacitors in series in the transmitting coil reduces the overall reactance of the branch that the transmitting coil is located on, which therefore increases the current supplied to the transmitting coil.

The tuning network behaves similarly to a series tuned primary in terms of its ability to automatically adjust primary coil current to compensate for Voc and power level changes due to variations in k. As a result, the required range of Vinv can be reduced significantly compared to an LCL tuned primary. Thus avoiding the high inverter currents. This special character is explained using FIGS. 8A-F, which demonstrates how the proposed circuit can be transformed into a series tuned primary.

Figure 8:
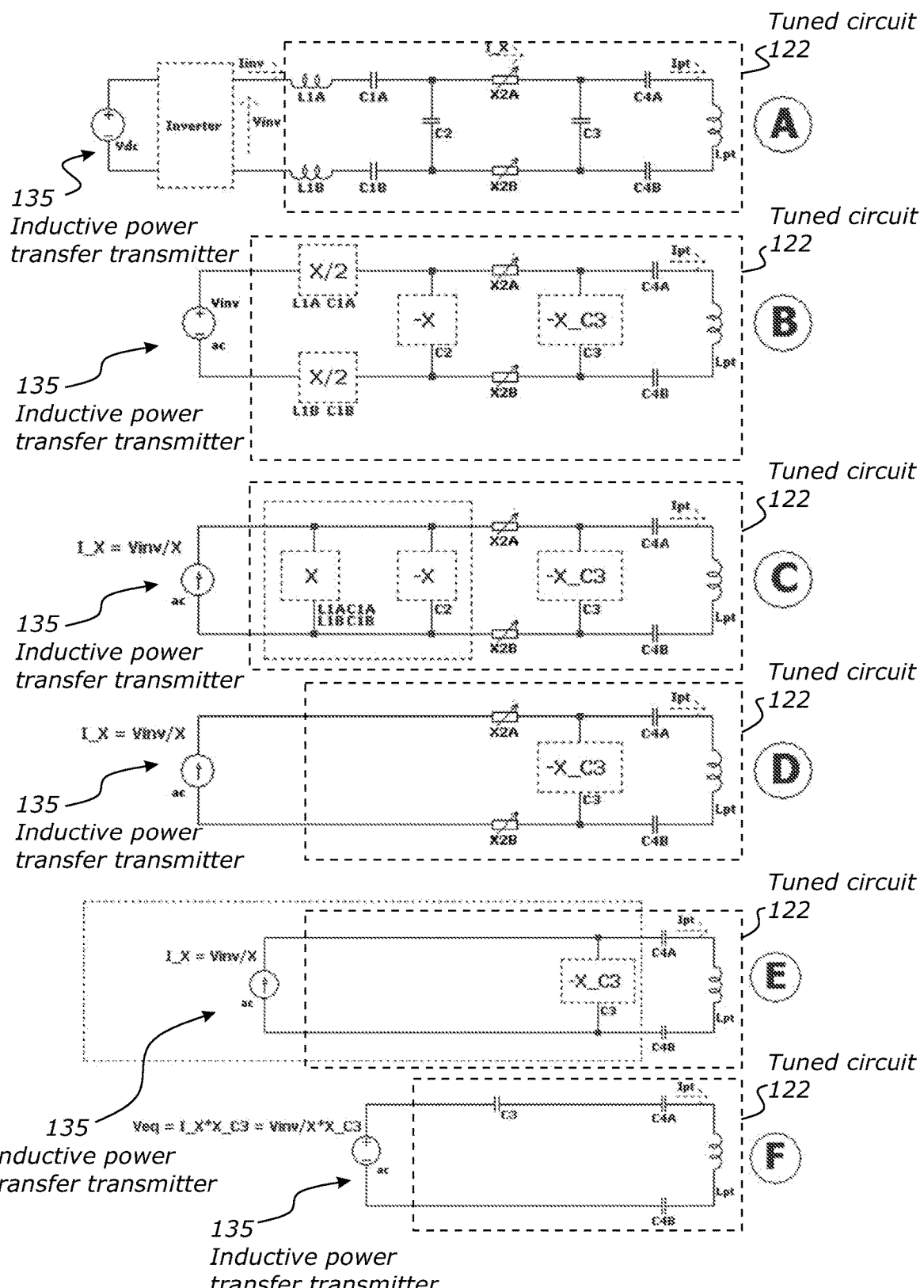
FIG. 8A-F shows how the embodiment of FIG. 7 can be remodelled to appear series tuned.

FIG. 8A illustrates the topology of the first exemplary embodiment and FIG. 8B shows its equivalent circuit by representing certain components with their impedances. According to Norton's theorem, we can transform the series connection of Vinv and combined impedances of L1A/B and C1A/B (X/2) into its parallel equivalent as shown in FIG. 8C, where a current source is in parallel with an impedance of (substantially) +X. The magnitude of current is Vinv/X. A parallel connection of (substantially) X and (substantially) −X leads to (or converges to) an infinite impedance because their combined impedance is substantially −X^2/(X−X). A denominator of zero is infinity. Therefore, in FIG. 8D, both +X and −X are (substantially) removed. Because X2A and X2B cannot change the magnitude of the current source, these two variable impedance blocks may also be removed, leading to the circuit in FIG. 8E, where the current source is placed in parallel with capacitor C3, which according to Thevenin's theorem can again be transformed back to a voltage source in series with an impedance as shown in FIG. 8F. The magnitude of the voltage is Veq=Vinv/X*XC3.

FIG. 8F is clearly a series tuned circuit and the primary coil current Ipt can be expressed as:

$$I_{pt} = \frac{V_{inv}\frac{X_{C3}}{X}}{\frac{1}{j\omega C_3} + \frac{1}{j\omega C_{4A}} + \frac{1}{j\omega C_{4B}} + j\omega L_{pt} + \frac{\omega^2 k^2 L_{pt} L_{st}}{Z\_Voc}}$$

As can be seen, the proposed circuit behaves similarly to a series tuned primary in terms of its ability to automatically vary Ipt to compensate for changes in power and Voc due to changes in k; a larger k leads to a smaller Ipt and vice versa. Lastly, it is worthwhile to mention because tunable impedances X2A and X2B are in series with the current source, changing their values do not alter the magnitude of the current source, and therefore do not change the power levels of the However, their unique positions in the circuit do allow them to control the power factor of inverter output very effectively. The decoupling between power and inverter power factor simplifies the control algorithm.

Figure 9:
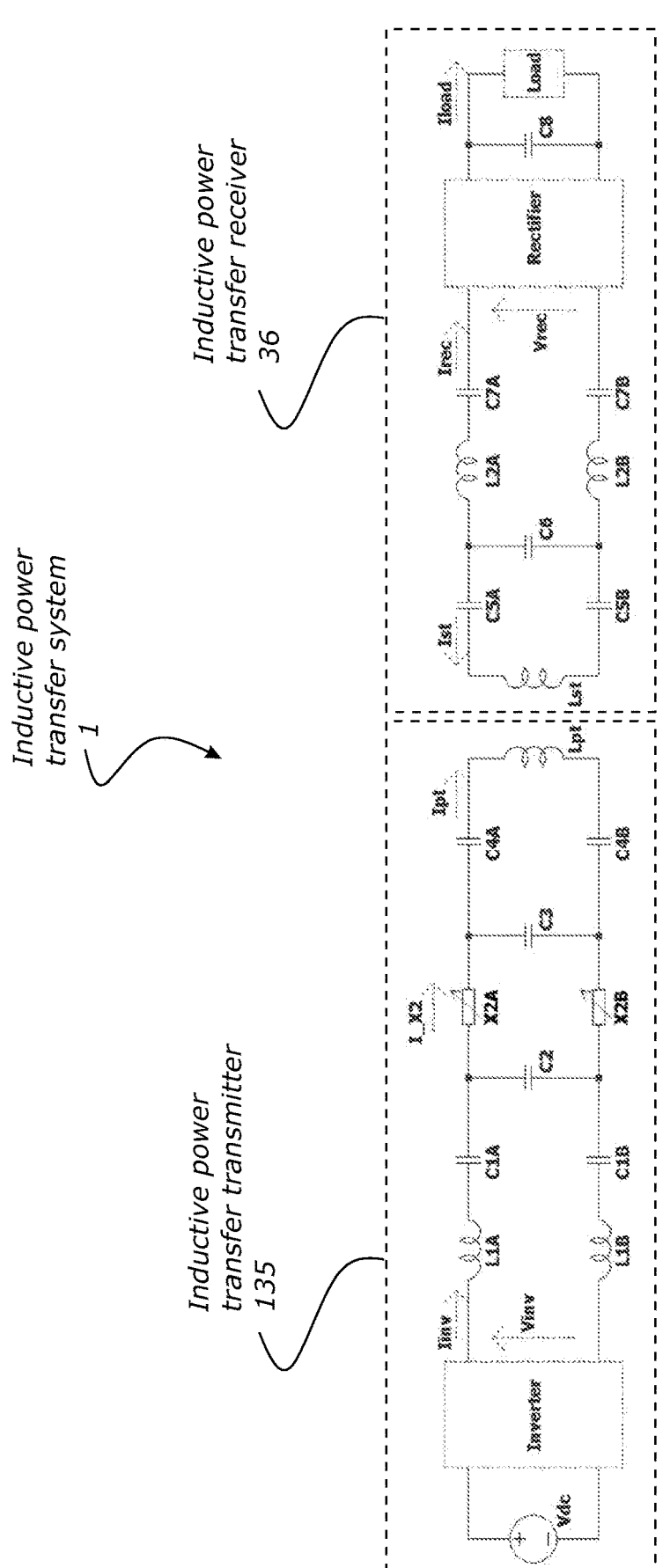
FIG. 9 shows the embodiment of FIG. 7 as part of an inductive power transfer system.

FIG. 9 shows the first exemplary embodiment as part of an inductive power transfer system 1

4.3.2 Second Exemplary Embodiment

Figure 10:
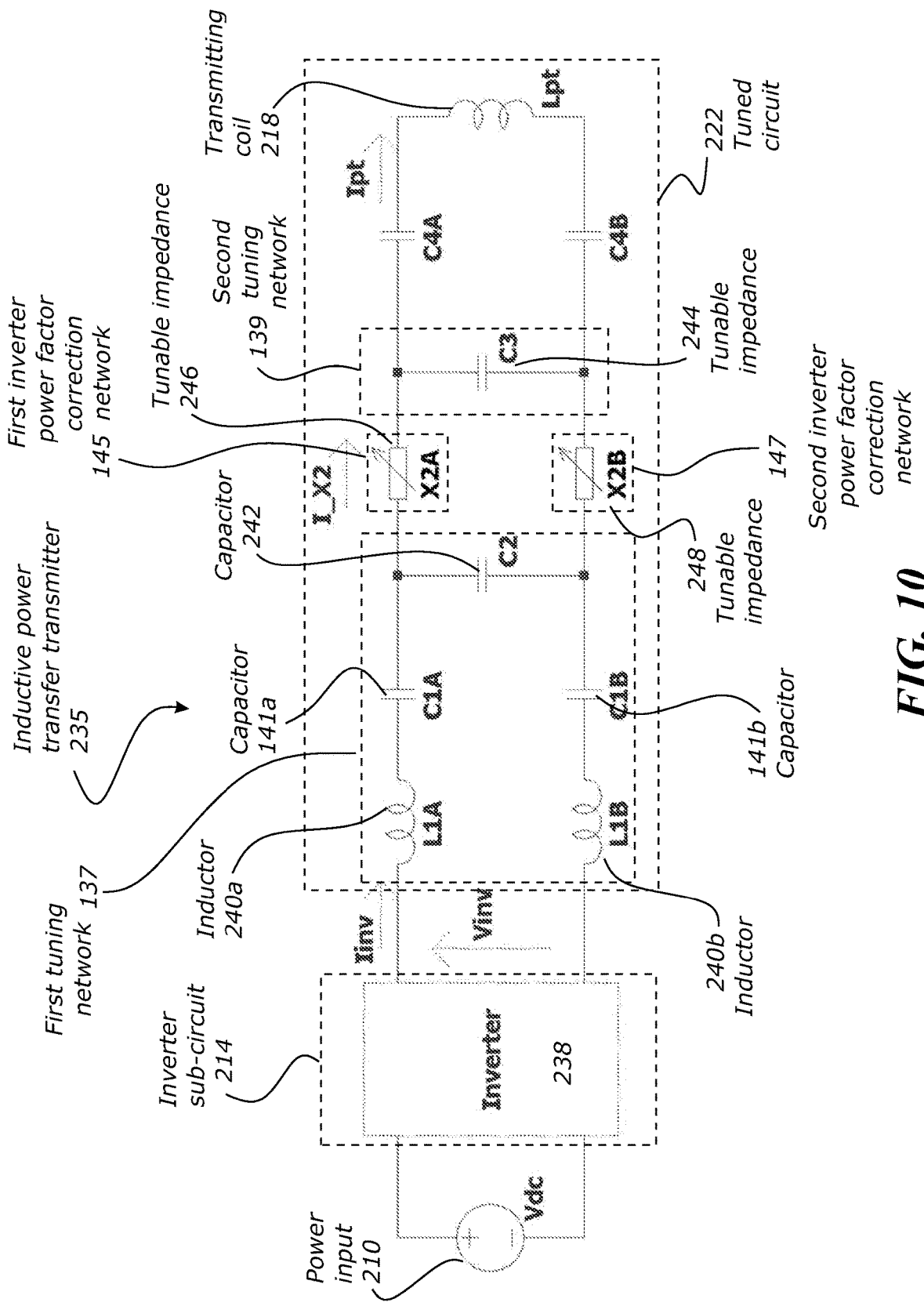
FIG. 10 shows a second exemplary embodiment of the first general embodiment of the tuned circuit.

The second exemplary embodiment of the inductive power transfer transmitter shown in FIG. 10 will now be described. The second exemplary embodiment shown in FIG. 10 comprises the following features:

inductive power transfer transmitter 235, which corresponds to inductive power transfer transmitter 35 power input 210, which corresponds to power input 10 inverter sub-circuit 214, which corresponds to inverter sub-circuit 14 inverter 238, which corresponds to inverter 38 tuned circuit 222, which corresponds to tuned circuit 22 first tuning network 237, which corresponds to first tuning network 37 second tuning network 239, which corresponds to second tuning network 39 first inverter power factor correction network 245, which corresponds to first inverter power factor correction network 45 second inverter power factor correction network 247, which corresponds to second inverter power factor correction network 47 inductor 240a ("L1A"), which corresponds to inductor 40a inductor 240b ("L1B"), which corresponds to inductor 40b capacitor 241a ("C1A"), which corresponds to capacitor 41a capacitor 241b ("C1B"), which corresponds to capacitor 41b capacitor 242 ("C2"), which corresponds to capacitor 42 tunable impedance 244 ("X3"), which corresponds to first additional component 44 tunable impedance 246 ("X2A"), which corresponds to second additional component 46 tunable impedance 248 ("X2B"), which corresponds to third additional component 48.

Figure 7:
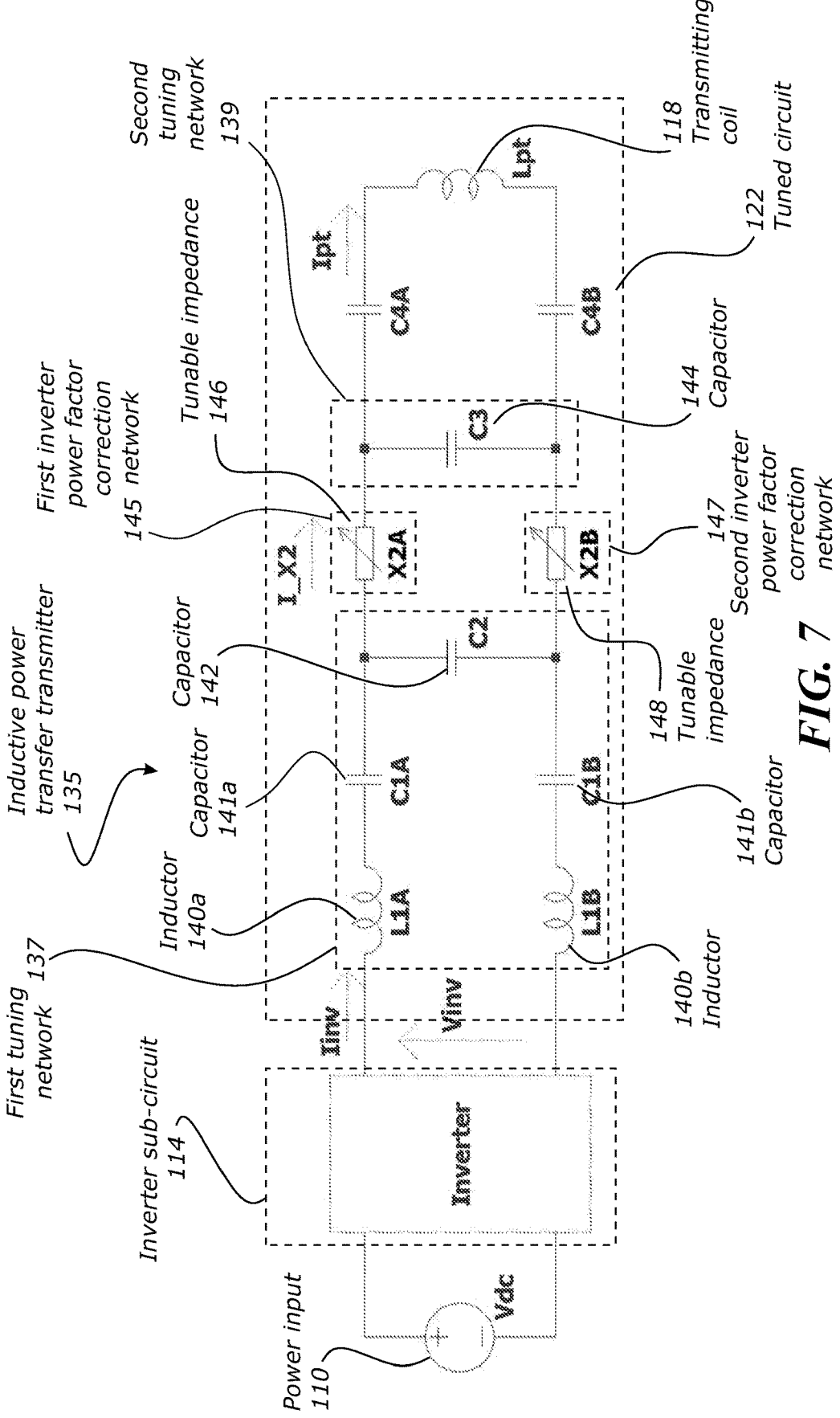
FIG. 7 shows a first exemplary embodiment of the first general embodiment of the tuned circuit.

The second exemplary embodiment differs from the first exemplary embodiment, where capacitor C3 in FIG. 7 is replaced by a tunable impedance X3.

Features of this second exemplary embodiment are as follows:

1. Primary coil current and power level can also be controlled by varying the impedance of X3 in addition to inverter output voltage. As a result, inverter phase shift and input dc voltage ranges can be further reduced.
2. Impedance X2A and X2B are used to control inverter power factor.
3. X3 can be either inductive or capacitive.

4.3.3 Third Exemplary Embodiment

Figure 11:
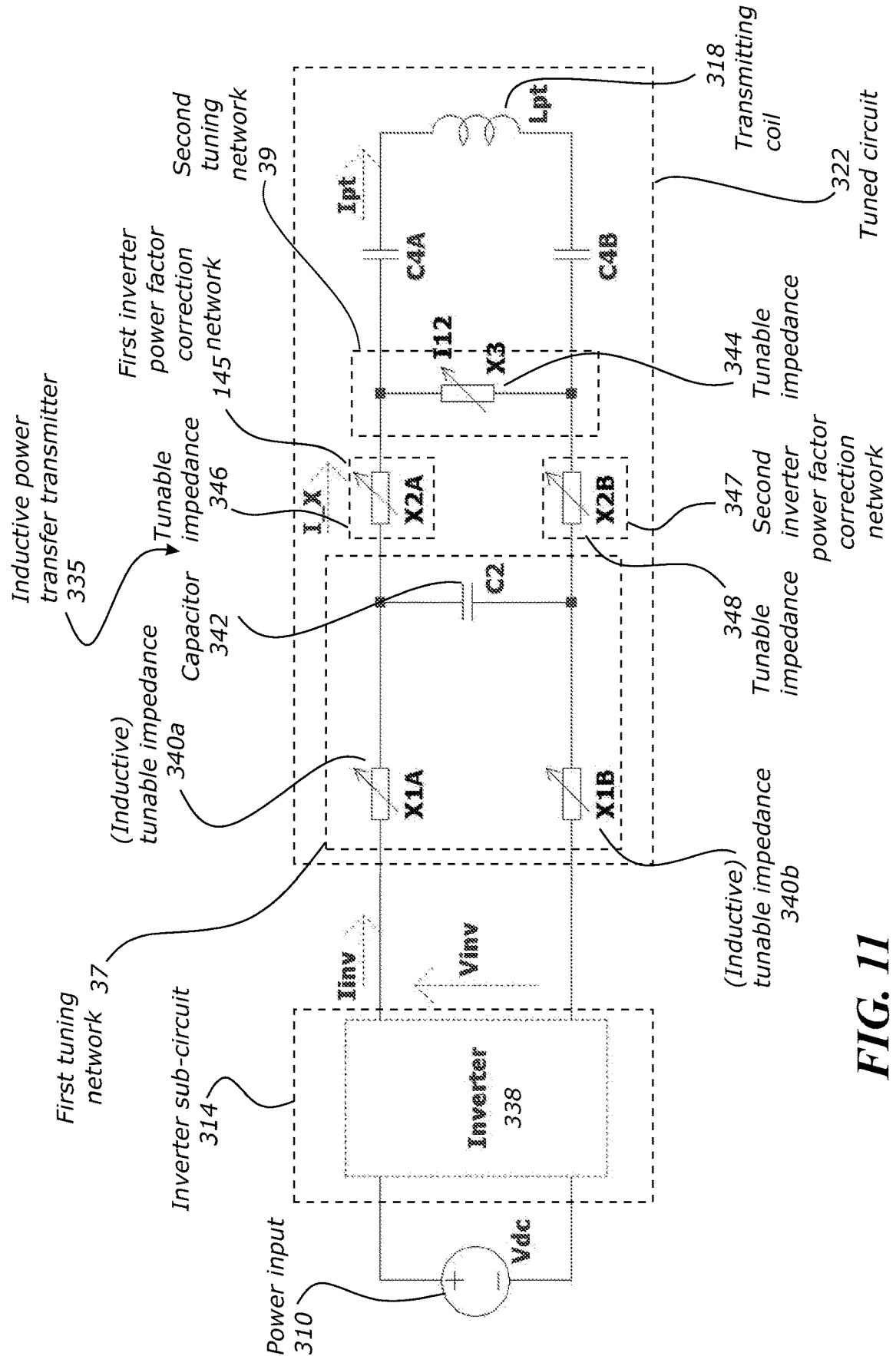
FIG. 11 shows a third exemplary embodiment of the first general embodiment of the tuned circuit.

The third exemplary embodiment of the inductive power transfer transmitter shown in FIG. 11 will now be described. The third exemplary embodiment shown in FIG. 11 comprises the following features:

inductive power transfer transmitter 335, which corresponds to inductive power transfer transmitter 35 power input 310, which corresponds to power input 10 inverter sub-circuit 314, which corresponds to inverter sub-circuit 14 inverter 338, which corresponds to inverter 38 tuned circuit 322, which corresponds to tuned circuit 22 first tuning network 337, which corresponds to first tuning network 37 second tuning network 339, which corresponds to second tuning network 39 first inverter power factor correction network 345, which corresponds to first inverter power factor correction network 45 second inverter power factor correction network 347, which corresponds to second inverter power factor correction network 47

(inductive) tunable impedance 340a ("X1A"), which corresponds to inductor 40a

(inductive) tunable impedance 340b ("X1B"), which corresponds to inductor 40b capacitor 342 ("C2"), which corresponds to capacitor 42 tunable impedance 344 ("X3"), which corresponds to first additional component 44 tunable impedance 346 ("X2A"), which corresponds to second additional component 46 tunable impedance 348 ("X2B"), which corresponds to third additional component 48.

The third exemplary embodiment shows X1A and X1B tunable, which will 1) help control power factor of inverter output voltage and 2) control primary coil current and power level.

5. Second (CL) General Embodiment of the Tuned Circuit

Overview 5.1

The second general embodiment of the tuned circuit will now be described. The purpose of the description that follows is intended to highlight the differences between the first and second general embodiments of the tuned circuit 22. It should be assumed that any description in relation to the first general embodiment of the tuned circuit 22 applies to the second general embodiment unless described differently in this section.

The second general embodiment of the tuned circuit will now be introduced with reference to FIG. 6D.

The tuned circuit 22 according to the second general embodiment will first be described at a "block level".

The tuned circuit 22 shown in FIG. 6D has a transmitting coil 18, a first tuning network 37, a second tuning network 39, a first inverter power factor correction network 45, and a second power factor correction network 47. At one end of the tuned circuit 22 is the first tuning network 37 (directly) located at the output of the inverter sub-circuit 14. At the other end of the tuned circuit 22 is transmitting coil 18. The second tuning network 39 is placed between the first tuning network 37 and the transmitting coil 18. The first and second inverter power factor correction networks 45, 47 are placed between the first tuning network 37 and the second tuning network 39.

The tuned circuit shown in FIG. 6D comprises:

a first tuning network 37 comprising capacitor 51a and capacitor 51b, and inductor 53 a second tuning network comprising additional component 44 a first inverter power factor correction network comprising at least additional component 46 a second inverter power factor correction network comprising at least additional component 48 a transmitting coil 18.

The components that form the tuned circuit of FIG. 6D will now be described in more detail.

The tuned circuit 22 has capacitors 51a and 51b placed at the output of the inverter sub-circuit 14. The capacitors 51a and 51b are placed on separate branches. Either capacitor 51a,b can be tunable so that its capacitance can be varied. The tuned circuit 22 also has a inductor 53 that connects between capacitors 51a and 51b. The inductor 53 can be tunable so that its inductance can be varied. The tuned circuit 22 has three parallel branches with the inductor 53, the additional component 44, and the transmitting coil 18 connected in parallel with each other. The tuned circuit 22 also has additional components 46 and 48 that are connected between the parallel branches of the capacitor 42 and the additional component 44. The additional components 46 and 48 are placed on separate branches to each other.

For the second general embodiment of the tuned circuit 22, it is not essential to have all the components shown in FIG. 6D. However, in this general embodiment, the tuned circuit 22 should at least include: the transmitting coil 18, a first tuning network 37 comprising at least: one capacitor (either capacitor 51*a* or 51*b* is fine but both capacitors 51*a,b* may optionally be incorporated), and one inductor (such as inductor 53 for example), and a second tuning network 39 comprising additional component 44. This is so that the tuned circuit 22 can vary current through the transmitting coil to compensate for variations in K coefficient.

5.2 Design Considerations

Various design considerations of the second general embodiment of the tuned circuit 22 will now be discussed. The design considerations include:

varying the primary coil current automatically over a large range to compensate for k change (similar to a series tuned primary) so that the required inverter output voltage range is reduced, while providing an output current from the inverter sub-circuit independent of the transmitting coil current (which is advantageous over a series tuned primary)

achieving improved EMI performance achieving improved efficiency (in terms of its ability to keep power factor of inverter output voltage close to 1)

controlling transmitting coil current improving current stability.

Each of these three advantages are described in the context as being able to provide an advantage over the tuned circuit topologies discussed in sections 2.1 and 2.2.

5.2.1 Automatic Varying of the Primary Coil Current to Compensate for Changes in k Coefficient The inductive power transmitter 35 desirably has a tuned circuit 22 comprising a plurality of components that are arranged such that the tuned circuit 22 can be remodelled, through a combination of Thevenin and Norton circuit analysis, into a series tuned primary coil arrangement. By enabling the tuned circuit 22 to be remodelled into a series tuned primary coil arrangement, the tuned circuit 22 is able to automatically adjust the current through the primary coil 18 in response to changes in the k coefficient in the same way as discussed above in section 2.1.1.

To achieve this desired outcome, the second general embodiment of tuned circuit 22 should have at least a first tuning network 37 comprising at least: a capacitor (and in the example of FIG. 6D having either capacitor 51*a* or capacitor 51*b* is sufficient), and an inductor 53, and a second tuning network 39 comprising: a first additional component 44. It is optional having two capacitors but it is not essential. It is optional having additional components 46, 48 but it is not essential.

For the rest of this section, an explanation will be given of how the components in the first and second tuning networks 37, 39 enable the second general embodiment of tuned circuit 22 to provide automatic varying of the transmitting coil current to compensate for changes in k coefficient.

The inductor and capacitor (in the first tuning network 37) enable Norton's theorem to be applied to transform the tuned circuit 22 from a series connection of a voltage source (provided by the voltage of the inverter sub-circuit), an inductor and a capacitor into a (circuit equivalent) parallel connection of a current source, an inductor and a capacitor. By having a (circuit equivalent) parallel connection of a current source, an inductor and a capacitor, the combined impedance of the inductor and capacitor creates an appearance of a large impedance (preferably an open circuit appearance) for the parallel connected current source (for example when the absolute reactance of the inductor and capacitor is substantially the same). Preferably, the absolute inductive reactance of the inductor is substantially equal to the absolute capacitive reactance of the capacitor, or to the absolute combined capacitive reactance of the capacitors if both capacitors 51*a,b* are used in the tuned circuit 22. Therefore, the first tuning network 37 becomes a constant current source.

Following the transformation provided by the first tuning network 37 into a constant current source, the tuned circuit 22 can be transformed further by applying Thevenin's theorem. This is made possible because of the existence of the first additional component 44 (in the second tuning network 39). Thevenin's theorem is applied to transform the parallel connection of the current source, the first additional component 44, and the transmitting coil 18 into a (circuit equivalent) series connection of a voltage source, the first additional component 44, and the transmitting coil 18. The (circuit equivalent) series connection provides the appearance of the transmitting coil 18 being series tuned, and as discussed in section 2.1.2 having a series tuned transmitting coil 18 means the tuned circuit 22 enables the automatic varying of the current through the transmitting coil 18 to compensate for changes in k coefficient.

Further, in the second general embodiment of the tuned circuit 22, the first tuning network 37 has an inductor 53 connected such that it provides a flow of current to the transmitting coil 18, and the second tuning network 39 has an additional component 44 such that it provides a flow of current to the transmitting coil 18. The flow of current each provided by the inductor 53 and the additional component 44 is in addition to the current provided from the output of the inverter sub-circuit. This means the current output of the inverter sub-circuit is independent to the transmitting coil current. That is, it is not necessary for the inverter sub-circuit 14 to match the current through the transmitting coil 18, and is allowed to be different. In contrast, in an actual series tuned transmitting coil circuit, the inverter sub-circuit will always be the same as the transmitting coil current.

This difference provides the tuned circuit 22 with an advantage over an actual series tuned transmitting coil circuit, and can be explained as follows. The tuned circuit 22 design allows the transmitting coil current is sourced from the inverter sub-circuit output but also have current sourced from current flowing through the inductor 53 and/or current flowing through additional component 44. By sourcing some of the transmitting coil current from other components, and not solely from the inverter sub-circuit output, the inverter sub-circuit output current can be designed to be less than the transmitting coil current. This allows the inverter sub-circuit output current to be reduced. In turn this reduces the power loss in the inverter sub-circuit. This explained advantage is especially applicable for high power applications, however a skilled person will appreciate that the explained advantage can also be implemented even if a high power application is not being considered.

As described, the current flowing out of the first tuning network 37 can be considered a current source whose magnitude is determined by I_X=Vinv/X, where X is impedance of inductor/s (e.g. capacitors 51*a* and/or 51*b*) or inductor 53. This magnitude remains unchanged regardless of how the rest of circuit changes. Therefore, the first tuning network can be considered a constant current source. If we ignore additional components 46 and 48 (because they are in series with the current source), the current source flows into both additional component 44 and transmitting coil 18.

However, the current distribution between additional component 44 and transmitting coil 18 is entirely dependent on the reflected impedance, which changes with power. The current in the inverter I_inv=Power/Vinv with a unit power factor, Vinv can be changed by the input voltage for the inverter sub-circuit and phase shift. Therefore, the current in the inverter sub-circuit is independent of current in the primary coil.

Figure 12B:
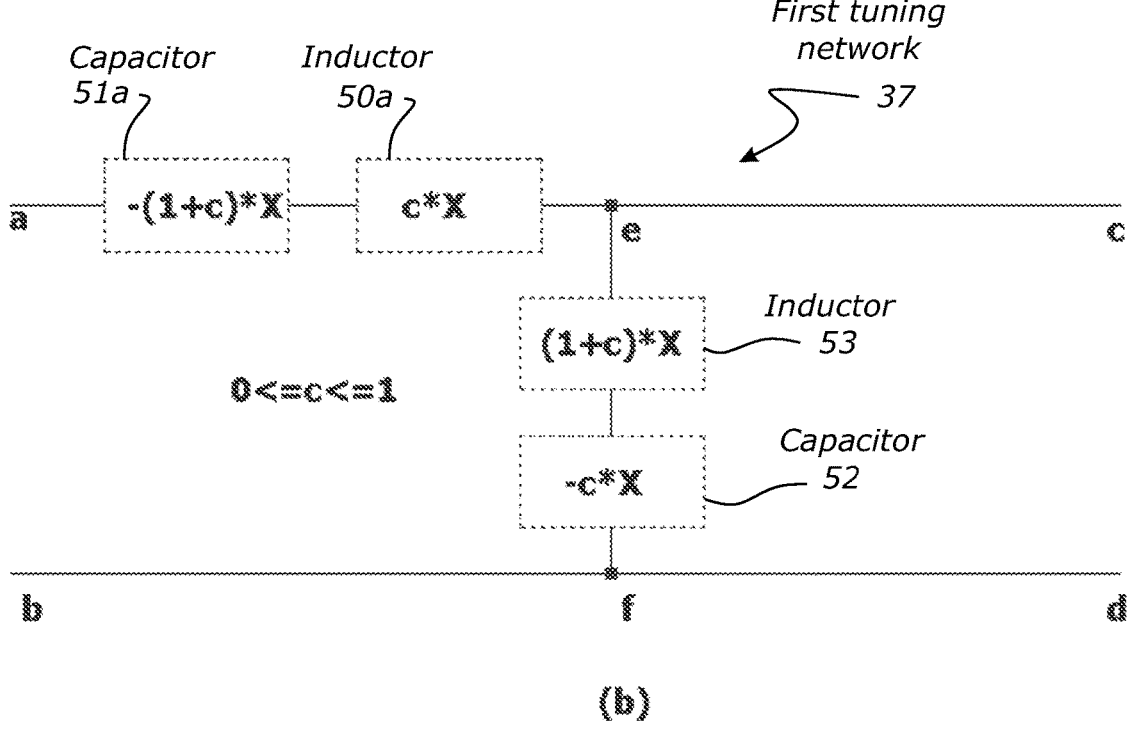
FIG. 12B shows an exemplary embodiment of a first tuning network of the second general embodiment of the tuned circuit.

In some embodiments, there may be one or more inductors connected in series with a capacitor in the first tuning network 37. Alternatively, or additionally, there may be one or more capacitors connected in series with the inductor in the first tuning network 37. FIG. 12B shows a generic example of this, where the first tuning network 37 has at least a capacitor 51a and an inductor 53, and (depending on the value of c) may also have an inductor 50a connected in series with capacitor 51a, as well as a capacitor 52 connected in series with inductor 53. In such a situation, it is desirable that the combined reactance of the components at the output of the inverter sub-circuit 14 is substantially the same as the combined reactance of the components connected in parallel with the transmitting coil 18 so that the second general embodiment of tuned circuit 22 can be remodelled as a series tuned transmitting coil such that K compensation is provided through automatic varying of current.

One example of this can be seen in FIG. 12B, where the combined reactance between terminals a and e is –X, indicating that the combined impedance is capacitive. Note constant c ranges from 0 to 1. When c=0, a capacitor (with an reactance of –X) is connected between terminals a and e and an inductor (with an reactance of X) is connected between terminals e and f. When C>0, both the capacitor and inductor are present between these terminals. The combined reactance between terminals e and f is X, which indicating that the combined impedance is inductive. A portion of the reactance X (between a and e) may also be shifted to be between terminals b and f provided that the sum of reactance between terminals a and e and terminals b and f is –X.

Further specific information can be found in section 4.3.1, and in particular, the accompanying description to FIGS. 8A-F. While section 4.3.1 is described in the context of a first exemplary embodiment, a skilled person will recognise that the principles discussed in section 4.3.1 also apply to this general embodiment as well.

5.2.2 Improved EMI Performance

It is also desirable for the inductive power transfer transmitter 35 to have a tuned circuit 22 comprising a plurality of components that are arranged such that the tuned circuit 22 improves EMI performance in the inductive power transfer transmitter 35. As discussed in section 2.1.2, having a tuning circuit with a series tuned transmitting coil is problematic because the tuning circuit provides poor filtering, so it does not adequately address the issue of high order harmonics that are generated from the inverter sub-circuit 14, which leads to issues in EMI performance. It is therefore desirable that the tuned circuit 22 acts as a filter to filter out high order harmonics that are generated from the inverter sub-circuit 14, or at least provide better filtering than what can be achieved from a tuning circuit with a series tuned circuit, in order to provide the inductive power transfer transmitter 35 with improved EMI performance.

Although not essential, it is preferable to provide improved filtering by having in the tuned circuit 22 an inductor placed in series with capacitor 51a and/or capacitor 51b (while ensuring a net capacitive impedance along the branch/es containing capacitor 51a and/or 51b in this general embodiment), and having a capacitor placed in series with inductor 53 (while ensuring a net inductive impedance along the branch containing inductor 53 in this general embodiment). Having an inductor placed at the output of the inverter sub-circuit 14 together with the capacitor 42 provides a filter to divert high order harmonics away from the transmitting coil 18, thus improving EMI performance in the inductive power transfer transmitter 35.

Although not essential, it is preferable that inductors placed in series with both capacitor 51a and capacitor 51b are used together with a capacitor placed in series with inductor 53 to filter out the high order harmonics. It is also preferable that the first additional component 44 is capacitive. It is preferable that the second additional component (which could be either additional component 46 or additional component 48) in the tuned circuit is capacitive. Even more preferable is that both additional components 46 and 48 are present in the tuned circuit 22 with both additional components being capacitive.

5.2.3 Improved Power Factor

It is also desirable for the inductive power transfer transmitter 35 to have a tuned circuit 22 comprising a plurality of components that are arranged such that the tuned circuit 22 can improve power factor of power provided from the inverter sub-circuit 14 to improve power efficiency of the inverter sub-circuit 14. The techniques used to improve power factor in the first general embodiment of the tuned circuit 22 apply to the second general embodiment also.

5.2.4 Control of Transmitting Coil Current

It is also desirable for the inductive power transfer transmitter 35 to have a tuned circuit 22 comprising a first additional component 44 that is a variable capacitor for the same reasons as discussed in relation to the first general embodiment of the tuned circuit 22.

5.2.5 Improved Current Stability

It is also preferable to place an inductor in series with capacitor 51a and/or capacitor 51b (while ensuring a net capacitive impedance along the branch/es containing capacitor 51a and/or 51b in this general embodiment). The series inductor(s) with capacitor 51a and/or 51b limits the current change rate to improve the operating stability.

The invention claimed is:

1. An inductive power transfer transmitter comprising:
an inverter sub-circuit comprising at least one inverter, and; and
a tuned circuit comprising a plurality of components including at least:
a transmitting coil;
a first tuning network comprising an inductor, and a capacitor; and
a second tuning network comprising a first additional component,
wherein the transmitting coil, the inductor, the capacitor, and the first additional component are each placed on separate branches of the tuned circuit, and
wherein the plurality of components are arranged such that the tuned circuit is configured to be remodeled as if the transmitting coil is series tuned so that the tuned circuit is configured to vary current through the transmitting coil to compensate for variations in K coefficient, and provide an output current from the inverter sub-circuit independent of a transmitting coil current.

2. An inductive power transfer transmitter according to claim 1 wherein the output current from the inverter sub-circuit is less than the transmitting coil current.

3. An inductive power transfer transmitter according to claim 1 wherein there is reduced current output from the inverter sub-circuit as a result of the two tuning networks that decouple the inverter from the transmitter coil.

4. An inductive power transfer transmitter according to claim 1 wherein there is reduced power loss in the inverter sub-circuit.

5. An inductive power transfer transmitter according to claim 1 wherein the tuned circuit further comprises at least one further additional component to improve power factor of power supplied from the inverter sub-circuit to the transmitting coil.

6. An inductive power transfer transmitter according to claim 5 wherein the at least one further additional component is a variable component to vary the power factor.

7. An inductive power transfer transmitter according to claim 6 wherein the variable component is a variable capacitor and/or a variable inductor.

8. An inductive power transfer transmitter according to claim 1 wherein the inductor and/or capacitor and/or the first additional component and/or a second additional component are arranged in the tuned circuit to provide filtering.

9. An inductive power transfer transmitter according to claim 8 wherein the tuned circuit can filter out harmonics in the output current from the inverter sub-circuit to improve EMI performance.

10. An inductive power transfer transmitter according to claim 1 wherein the tuned circuit comprises a variable component that is a variable to vary the portion of current through transmitting coil.

11. An inductive power transfer transmitter according to claim 10 wherein the variable component is a variable capacitor and/or a variable inductor.

12. An inductive power transfer transmitter according to claim 1, wherein the inductor is placed at the output of the inverter sub-circuit.

13. An inductive power transfer transmitter according to claim 1, wherein the capacitor is placed at the output of the inverter sub-circuit.

14. An inductive power transfer transmitter according to claim 1, wherein the branch the capacitor is located on intersects with the branch that the inductor is located on.

15. An inductive power transfer transmitter according to claim 1 wherein the capacitor, the first additional component and the transmitting coil are connected in parallel.

16. An inductive power transfer transmitter according to claim 1 wherein the inductor, the first additional component and the transmitting coil are connected in parallel.

17. An inductive power transfer transmitter according to claim 1, wherein the first and second tuning networks together are Norton and Thevenin equivalent of a series tuned circuit to vary current through a transmitting coil to compensate for variations in K coefficient, while comprising one or more components, optionally parallel to the transmitting coil, to decouple the inverter from the transmitter coil.

18. An inductive power transfer transmitter according to claim 1, wherein the tuned circuit can be remodeled by:

applying Norton's theorem to transform a series connection of a voltage source (provided by the voltage of the inverter sub-circuit), the inductor and the capacitor into a parallel connection of a current source, the inductor and the capacitor, for creating an appearance of the first tuning network providing a current source for the transmitting coil, and applying Thevenin's theorem to transform a parallel connection of the current source, the first additional component, and the transmitting coil into a series connection of a voltage source, the first additional component and the transmitting coil, such that the transmitting coil appears series tuned.

19. An inductive power transfer transmitter according to claim 18, wherein the inductor and capacitor each have an absolute reactance such that the absolute reactance of the inductor is substantially the same as the absolute reactance of the capacitor such that the combined impedance of the inductor and capacitor creates an appearance of an open circuit component so that the first tuning network appears to provide the current source to the transmitting coil.

20. An inductive power transfer transmitter according to claim 1, wherein the first tuning network further comprises a second inductor, the second inductor is located at the output of the inverter sub-circuit, the second inductor located on a branch separate to the first inductor branch.

21. An inductive power transfer transmitter according to claim 1, wherein the first tuning network further comprises a second capacitor, the second capacitor is located at the output of the inverter sub-circuit, the second capacitor located on a branch separate to the first capacitor branch.

22. An inductive power transfer transmitter according to claim 1, wherein the tuned circuit further comprises a second additional component, wherein:

the second additional component is located on a branch that intersects with the branch that the capacitor is located on;

the second additional component is located on a branch that intersects with the branch that the inductor is located on; and/or the branch the first additional component is located on intersects with the branch that the second additional component is located on.

23. An inductive power transfer transmitter according to claim 1, wherein one or more of:

the first inductor, a second inductor, the capacitor, the first additional component, a second additional component, and a third additional component are tunable or fixed in any combination.

* * * * *